(12) United States Patent
Matsuoka et al.

(10) Patent No.: US 11,817,572 B2
(45) Date of Patent: Nov. 14, 2023

(54) SECONDARY BATTERY, BATTERY PACK, ELECTRICALLY DRIVEN VEHICLE, ELECTRIC POWER STORAGE SYSTEM, ELECTRIC TOOL, AND ELECTRONIC DEVICE

(71) Applicant: MURATA MANUFACTURING CO., LTD., Kyoto (JP)

(72) Inventors: Ryosuke Matsuoka, Kyoto (JP); Takashige Fujikawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 448 days.

(21) Appl. No.: 16/735,266

(22) Filed: Jan. 6, 2020

(65) Prior Publication Data

US 2020/0144596 A1 May 7, 2020

Related U.S. Application Data

(63) Continuation of application No. PCT/JP2018/025927, filed on Jul. 9, 2018.

(30) Foreign Application Priority Data

Jul. 7, 2017 (JP) .................................. 2017-134094

(51) Int. Cl.
*H01M 4/131* (2010.01)
*H01M 4/485* (2010.01)
(Continued)

(52) U.S. Cl.
CPC .......... *H01M 4/131* (2013.01); *H01M 4/364* (2013.01); *H01M 4/485* (2013.01); *H01M 4/525* (2013.01);
(Continued)

(58) Field of Classification Search
None
See application file for complete search history.

(56) References Cited

U.S. PATENT DOCUMENTS

| | | | |
|---|---|---|---|
| 2007/0092802 A1* | 4/2007 | Ahn | H01M 10/0564 429/200 |
| 2009/0017381 A1* | 1/2009 | Saruwatari | H01M 4/665 429/221 |

(Continued)

FOREIGN PATENT DOCUMENTS

| | | |
|---|---|---|
| JP | 2009038017 A | 2/2009 |
| JP | 2013191439 A | 9/2013 |

(Continued)

OTHER PUBLICATIONS

Toshiba press release (commercialization of new secondary battery "SCiB"), Dec. 11, 2007.

(Continued)

*Primary Examiner* — Zhongqing Wei
(74) *Attorney, Agent, or Firm* — K&L Gates LLP

(57) ABSTRACT

A secondary battery includes a positive electrode; a negative electrode including a negative electrode active material layer including a negative electrode active material and a negative electrode conductive agent, and an electrolytic solution. The negative electrode active material includes a plurality of primary negative electrode active material particles and a plurality of secondary negative electrode active material particles, and the negative electrode active material includes a lithium titanium composite oxide.

10 Claims, 7 Drawing Sheets

(51) Int. Cl.
    *H01M 4/58*     (2010.01)
    *H01M 4/62*     (2006.01)
    *H01M 4/36*     (2006.01)
    *H01M 4/525*    (2010.01)
    *H01M 10/0567*  (2010.01)
    *H01M 10/0525*  (2010.01)
    *H01M 10/0569*  (2010.01)

(52) U.S. Cl.
    CPC .............. *H01M 4/58* (2013.01); *H01M 4/621* (2013.01); *H01M 4/625* (2013.01); *H01M 10/0525* (2013.01); *H01M 10/0567* (2013.01); *H01M 10/0569* (2013.01)

(56) References Cited

U.S. PATENT DOCUMENTS

| | | | | |
|---|---|---|---|---|
| 2010/0255352 | A1* | 10/2010 | Inagaki | ................. H01M 50/20 |
| | | | | 429/231.5 |
| 2014/0027679 | A1* | 1/2014 | Kim | ..................... H01M 4/485 |
| | | | | 423/598 |
| 2015/0162584 | A1 | 6/2015 | Uematsu et al. | |
| 2016/0149177 | A1* | 5/2016 | Sugeno | ............... H01M 10/425 |
| | | | | 429/151 |

FOREIGN PATENT DOCUMENTS

| | | |
|---|---|---|
| JP | 2014167938 A | 9/2014 |
| JP | 2014527267 A | 10/2014 |
| JP | 2016126900 | 7/2016 |

OTHER PUBLICATIONS

International Search Report for Application No. PCT/JP2018/025927, dated Oct. 9, 2018.
Extended European Search Report dated Feb. 8, 2021 in corresponding European Application No. 18828671.0.
European Office Action dated Feb. 17, 2023 in corresponding European Application No. 18 828 671.0.
A Basic Guide to Particle Characterization, Malvern Instruments Worldwide, 2012 Malvern Instruments Limited.

* cited by examiner

EXTERIOR    COUNTER         SEPARATOR
CAP         ELECTRODE

SECONDARY BATTERY, BATTERY PACK, ELECTRICALLY DRIVEN VEHICLE, ELECTRIC POWER STORAGE SYSTEM, ELECTRIC TOOL, AND ELECTRONIC DEVICE

CROSS REFERENCE TO RELATED APPLICATIONS

The present application is a continuation of PCT patent application no. PCT/JP2018/025927, filed on Jul. 9, 2018, which claims priority to Japanese patent application no. JP2017-134094 filed on Jul. 7, 2017, the entire contents of which are being incorporated herein by reference.

BACKGROUND

The present technology generally relates to a secondary battery including a negative electrode containing a negative electrode active material and a negative electrode conductive agent and a battery pack, an electrically driven vehicle, an electric power storage system, an electric tool, and an electronic device including the secondary battery.

A variety of electronic devices such as mobile phones are widely used, and there is a demand for downsizing, weight saving, and prolonged lifetime of the electronic devices. Hence, the development of secondary batteries which are small and lightweight and capable of providing a high energy density as a power source is underway.

It is investigated to apply secondary batteries not only to electronic devices but also to other applications. Examples of other applications include battery packs detachably mounted on electronic devices, electrically driven vehicles such as electric vehicles, electric power storage systems such as household electric power servers, and electric tools such as electric drills.

Specifically, secondary batteries include an electrolytic solution together with a positive electrode and a negative electrode, and the negative electrode contains a negative electrode active material and a negative electrode conductive agent. Various investigations on the composition of negative electrode have been carried out since the composition of negative electrode greatly affects the battery characteristics.

Specifically, a carbon material such as artificial graphite is used as a negative electrode conductive agent as well as lithium titanium composite oxides such as lithium titanate ($Li_4Ti_5O_{12}$) are used as a negative electrode active material in order to suppress characteristic deterioration at the time of overcharge as well as to obtain excellent charge and discharge characteristics.

SUMMARY

The present technology generally relates to a secondary battery including a negative electrode containing a negative electrode active material and a negative electrode conductive agent and a battery pack, an electrically driven vehicle, an electric power storage system, an electric tool, and an electronic device including the secondary battery.

Electronic devices and the like on which secondary batteries are mounted have been sophisticated and multi-functioned more and more. Accordingly, the frequency of use of electronic devices and the like have increased as well as the use environment of the electronic devices and the like have expanded. Hence, there is still room for improvement with regard to the battery characteristics of secondary batteries.

The present technology has been made in view of such a problem, and an object thereof is to provide a secondary battery capable of providing excellent battery characteristics, a battery pack, an electrically driven vehicle, an electric power storage system, an electric tool, and an electronic device.

According to an embodiment of the present disclosure, a secondary battery is provided. The secondary battery includes a positive electrode; a negative electrode including a negative electrode active material layer including a negative electrode active material and a negative electrode conductive agent, and an electrolytic solution, wherein the negative electrode active material includes a plurality of primary negative electrode active material particles and a plurality of secondary negative electrode active material particles, and the negative electrode active material includes a lithium titanium composite oxide, wherein the lithium titanium composite oxide includes at least one of compounds represented by respective Formulas (1) to (3), wherein a ratio of a number of the plurality of primary negative electrode active material particles to a sum of the number of the plurality of primary negative electrode active material particles and a number of the secondary negative electrode active material particles is 95% or more, wherein a median diameter D50 of the plurality of primary negative electrode active material particles is from 0.1 μm to 1 μm, wherein the negative electrode conductive agent includes a plurality of flaky carbon materials, an average aspect ratio of the plurality of flaky carbon materials is from 6 to 8.5, and wherein a ratio of a weight of the negative electrode conductive agent with respect to a weight of the negative electrode active material layer is 2.5% by weight or less.

$$Li[Li_xM1_{(1-3x)/2}Ti_{(3+x)/2}]O_4 \tag{1}$$

(M1 represents at least one kind among magnesium (Mg), calcium (Ca), copper (Cu), zinc (Zn), and strontium (Sr). x satisfies 0≤x≤1/3.)

$$Li[Li_yM2_{1-3y}Ti_{1+2y}]O_4 \tag{2}$$

(M2 represents at least one kind among aluminum (Al), scandium (Sc), chromium (Cr), manganese (Mn), iron (Fe), germanium (Ge), gallium (Ga), and yttrium (Y). y satisfies 0≤y≤1/3.)

$$Li[Li_{1/3}M3_zTi_{(5/3)-z}]O_4 \tag{3}$$

(M3 represents at least one kind among vanadium (V), zirconium (Zr), and niobium (Nb). z satisfies 0≤z≤2/3.)

A battery pack, an electrically driven vehicle, an electric power storage system, an electric tool, and an electronic device according to an embodiment of the present technology each include a secondary battery, and the secondary battery has a configuration similar to that of the secondary battery according to an embodiment of the present technology.

Here, the "primary negative electrode active material particles" are primary particles among a plurality of particulate negative electrode active materials. In addition, the "secondary negative electrode active material particles" are secondary particles among a plurality of particulate negative electrode active materials and are an assembly (aggregate) of a plurality of primary particles.

According to the secondary battery of an embodiment of the present technology, the negative electrode includes a negative electrode active material layer including a negative electrode active material and a negative electrode conductive agent and each of the negative electrode active material and the negative electrode conductive agent has the configuration as described herein, and thus excellent battery characteristics can be attained.

In addition, similar effects can be attained in the battery pack, the electrically driven vehicle, the electric power storage system, the electric tool, or the electronic device of the present technology.

It should be understood that the effects described here are not necessarily limited and may be any effect described in the present technology.

DETAILED DESCRIPTION

As described herein, the present disclosure will be described based on examples with reference to the drawings, but the present disclosure is not to be considered limited to the examples, and various numerical values and materials in the examples are considered by way of example.

First, a secondary battery of an embodiment of the present technology will be described.

The secondary battery to be described here is, for example, a secondary battery using lithium as an electrode reactant and is more specifically a lithium ion secondary battery in which the battery capacity (the capacity of negative electrode) is attained by utilizing a lithium storage phenomenon and a lithium release phenomenon. This "electrode reactant" is a substance to be used in order to advance the electrode reaction (charge and discharge reaction).

Figure 1:
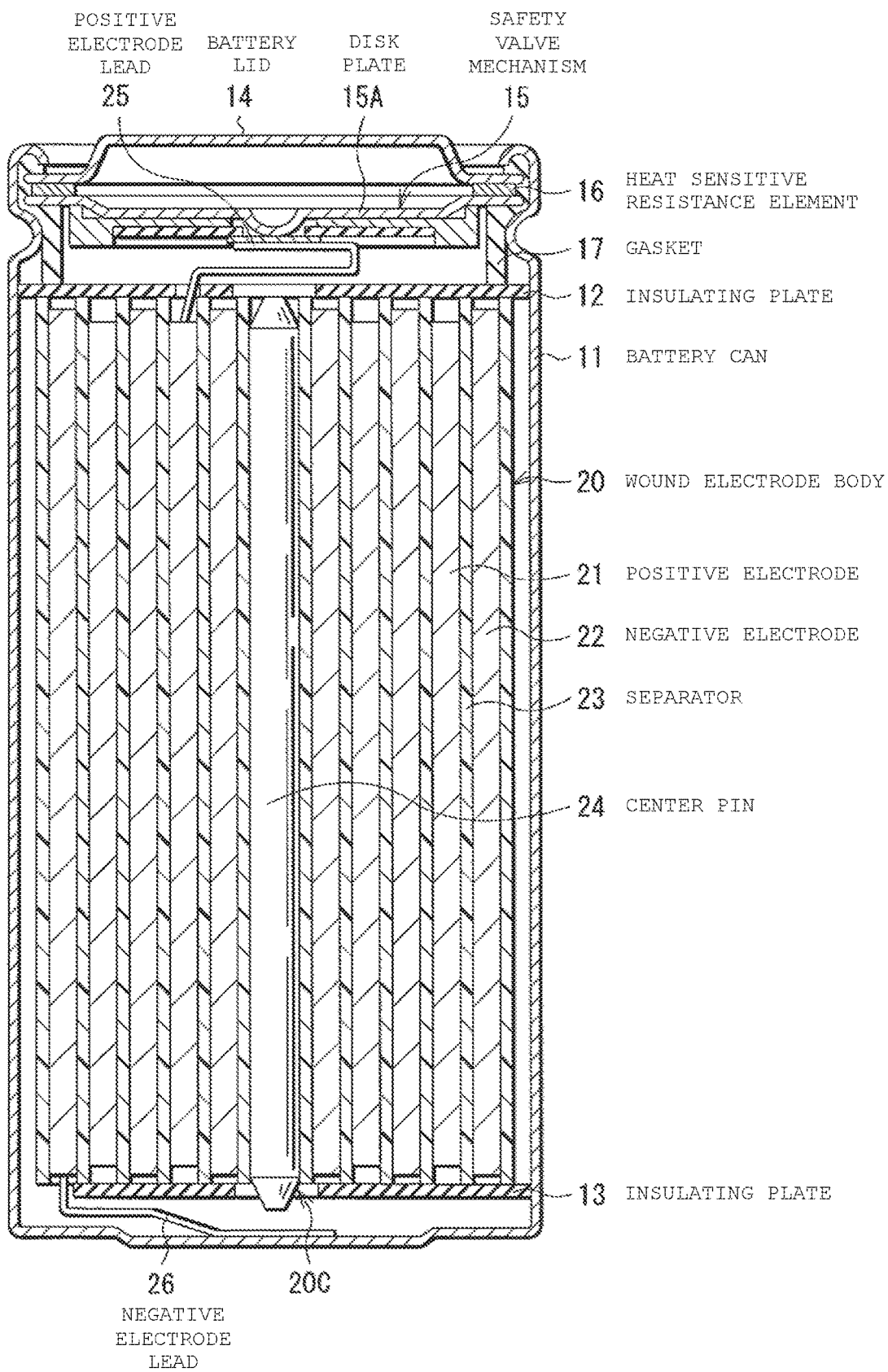
FIG. 1 is a cross-sectional diagram illustrating the configuration of a secondary battery (cylindrical type) according to an embodiment of the present technology.
Figure 2:
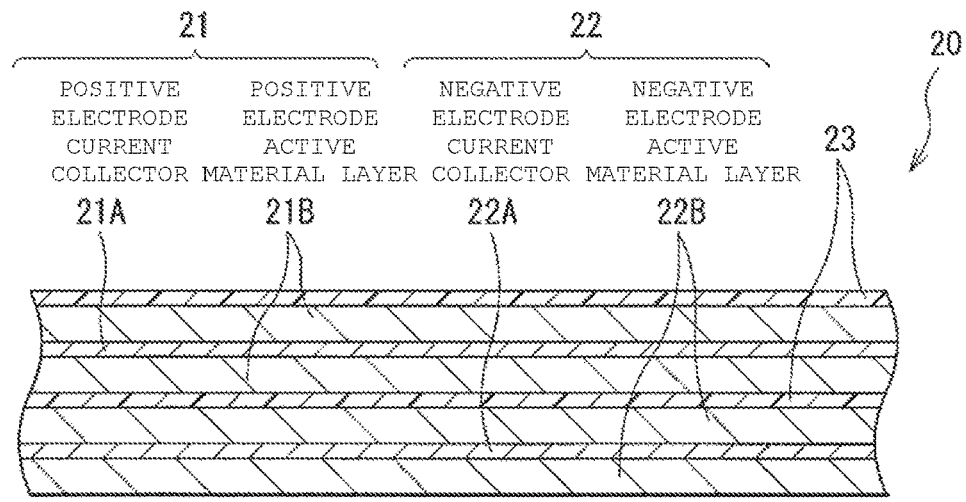
FIG. 2 is an enlarged cross-sectional diagram illustrating a part of the configuration of a wound electrode body illustrated in FIG. 1.

First, the configuration of the secondary battery will be described. FIG. 1 illustrates a cross-sectional configuration of a secondary battery, and FIG. 2 illustrates an enlarged diagram of a part of the cross-sectional configuration of a wound electrode body 20 illustrated in FIG. 1.

This secondary battery is a cylindrical type secondary battery in which a wound electrode body 20 which is a battery element is housed inside a cylindrical battery can 11, for example, as illustrated in FIG. 1.

Specifically, the secondary battery includes, for example, a pair of insulating plates 12 and 13 and the wound electrode body 20 inside the battery can 11.

The battery can 11 has, for example, a hollow structure in which one end portion is closed as well as the other end portion is opened and contains any one kind or two or more kinds among, for example, iron, aluminum, and alloys thereof. For example, a metal material such as nickel may be plated on the surface of the battery can 11.

The pair of insulating plates 12 and 13 are disposed, for example, so as to sandwich the wound electrode body 20 therebetween as well as to extend in a direction perpendicular to the wound peripheral surface of the wound electrode body 20.

A battery lid 14, a safety valve mechanism 15, and a heat sensitive resistance element (PTC element) 16 are crimped to the open end portion of the battery can 11 with a gasket 17 interposed therebetween. The battery can 11 is thus sealed.

The material for forming the battery lid 14 is, for example, the same as the material for forming the battery can 11.

Each of the safety valve mechanism 15 and the heat sensitive resistance element 16 is provided inside the battery lid 14, and the safety valve mechanism 15 is electrically connected to the battery lid 14 via the heat sensitive resistance element 16.

In this safety valve mechanism 15, a disk plate 15A is reversed when the internal pressure of the battery can 11 is raised to a certain value or more by an internal short circuit, external heating and the like, and the electrical connection between the battery lid 14 and the wound electrode body 20 is thus disconnected. In order to prevent abnormal heat generation due to a large current, the electric resistance of the heat sensitive resistance element 16 increases as the temperature increases.

The gasket 17 contains, for example, any one kind or two or more kinds among insulating materials. The surface of the gasket 17 may be coated with, for example, asphalt.

The wound electrode body 20 is formed as, for example, a positive electrode 21 and a negative electrode 22 are stacked with a separator 23 interposed therebetween and then the positive electrode 21, the negative electrode 22, and the separator 23 are wound. This wound electrode body 20 is impregnated with, for example, an electrolytic solution which is a liquid electrolyte.

For example, a center pin 24 is inserted in the space (winding center 20C) provided at the winding center of the wound electrode body 20. However, the center pin 24 may be omitted.

A positive electrode lead 25 is connected to the positive electrode 21, and the positive electrode lead 25 contains any one kind or two or more kinds among, for example, conductive materials such as aluminum. This positive electrode lead 25 is connected to, for example, the safety valve mechanism 15 and is thus electrically conducted to the battery lid 14.

A negative electrode lead 26 is connected to the negative electrode 22, and the negative electrode lead 26 contains any one kind or two or more kinds among, for example, conductive materials such as nickel. This negative electrode lead 26 is connected to, for example, the battery can 11 and is thus electrically conducted to the battery can 11.

The positive electrode 21 includes a positive electrode current collector 21A and two positive electrode active material layers 21B provided on both surfaces of the positive electrode current collector 21A, for example, as illustrated in FIG. 2. However, only one positive electrode active material layer 21B may be provided on one surface of the positive electrode current collector 21A.

The positive electrode current collector 21A contains any one kind or two or more kinds among, for example, conductive materials such as aluminum, nickel, and stainless steel.

This positive electrode current collector 21A may be a single layer or a multilayer.

The positive electrode active material layer 21B contains a positive electrode active material capable of storing and releasing lithium. The kind of positive electrode active material may be only one kind or two or more kinds. However, the positive electrode active material layer 21B may further contain any one kind or two or more kinds among other materials such as a positive electrode binder and a positive electrode conductive agent.

The positive electrode active material is, for example, a lithium-containing compound. This is because a high energy density is attained. The kind of lithium-containing compound is not particularly limited, but examples of the lithium-containing compound include a lithium-containing phosphate compound and a lithium-containing composite oxide.

The "lithium-containing phosphate compound" is the generic term for phosphate compounds containing lithium and one or two or more other elements as constituent elements and has, for example, an olivine type crystal structure. The "lithium-containing composite oxide" is the generic term for oxides containing lithium and one or two or more other elements as constituent elements and has any crystal structure among, for example, a layered rock salt type crystal structure and a spinel type crystal structure. Incidentally, "other elements" are elements other than lithium.

The kind of other elements is not particularly limited, but among others, elements belonging to groups 2 to 15 in the extended periodic table are preferable. Specifically, the other elements are, for example, nickel (Ni), cobalt (Co), manganese (Mn), and iron (Fe). This is because a high voltage is attained.

Examples of the lithium-containing phosphate compound having an olivine type crystal structure include a compound represented by Formula (11).

$$Li_aM11PO_4 \qquad (11)$$

(M11 represents at least one kind among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. However, the composition of lithium varies depending on the charged and discharged state, and a represents a value in a fully discharged state.)

Specific examples of the lithium-containing phosphate compound having an olivine type crystal structure include $LiFePO_4$, $LiMnPO_4$, $LiFe_{0.5}Mn_{0.5}PO_4$, and $LiFe_{0.3}Mn_{0.7}PO_4$.

Examples of the lithium-containing composite oxide having a layered rock salt type crystal structure include compounds represented by respective Formulas (12) to (14).

$$Li_aMn_{(1-b-c)}Ni_bM12_cO_{(2-d)}F_e \qquad (12)$$

(M12 represents at least one kind among cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. However, the composition of lithium varies depending on the charged and discharged state, and a represents a value in a fully discharged state.)

$$Li_aNi_{(1-b)}M13_bO_{(2-c)}F_d \qquad (13)$$

(M13 represents at least one kind among cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0.005 \leq b \leq 0.5$, $-0.1 \leq c \leq 0.2$, and $0 \leq d \leq 0.1$. However, the composition of lithium varies depending on the charged and discharged state, and a represents a value in a fully discharged state.)

$$Li_aCo_{(1-b)}M14_bO_{(2-c)}F_d \qquad (14)$$

(M14 represents at least one kind among nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0 < b < 0.5$, $-0.1 < c \leq 0.2$, and $0 \leq d \leq 0.1$. However, the composition of lithium varies depending on the charged and discharged state, and a represents a value in a fully discharged state.)

Specific examples of the lithium-containing composite oxide having a layered rock salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

Incidentally, in a case in which the lithium-containing composite oxide having a layered rock salt type crystal structure contains nickel, cobalt, manganese, and aluminum as constituent elements, the atomic ratio of nickel is preferably 50 atomic % or more. This is because a high energy density is attained.

Examples of the lithium-containing composite oxide having a spinel type crystal structure include a compound represented by Formula (15).

$$Li_aMn_{(2-b)}M15_bO_cF_d \qquad (15)$$

(M15 represents at least one kind among cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 < a \leq 1.1$, $0 < b < 0.6$, $3.7 < c \leq 4.1$, and $0 \leq d < 0.1$. However, the composition of lithium varies depending on the charged and discharged state, and a represents a value in a fully discharged state.)

Specific examples of the lithium-containing composite oxide having a spinel type crystal structure include $LiMn_2O_4$.

Incidentally, the lithium-containing composite oxide may be a compound represented by Formula (16).

$$(Li_2MnO_3)_x(LiMnO_2)_{1-x} \qquad (16)$$

(x satisfies 0≤x≤1. However, the composition of lithium varies depending on the charged and discharged state, and x represents a value in a fully discharged state.)

Among these, the lithium-containing compound is preferably a lithium-containing phosphate compound, and more specifically a compound represented by Formula (11) is preferable. This is because the lithium-containing phosphate compound is electrochemically stable and thus the battery characteristics of the secondary battery are stabilized. This prolongs the lifetime of the secondary battery.

In addition to these, the positive electrode active material may be, for example, oxides, disulfides, chalcogenides, and conductive polymers. Examples of the oxides include titanium oxide, vanadium oxide, and manganese dioxide. Examples of the disulfides include titanium disulfide and molybdenum sulfide. Examples of the chalcogenides include niobium selenide. Examples of the conductive polymers include sulfur, polyaniline, and polythiophene.

The positive electrode binder contains any one kind or two or more kinds among, for example, synthetic rubber and polymer compounds. Examples of the synthetic rubber include styrene butadiene-based rubber, fluorine-based rubber, and ethylene propylene diene. Examples of the polymer compounds include polyvinylidene fluoride and polyimide.

The positive electrode conductive agent contains any one kind or two or more kinds among, for example, conductive materials such as carbon materials. Examples of these carbon materials include graphite, carbon black, acetylene black, and ketjen black. However, the positive electrode conductive agent may be a metal material, a conductive polymer and the like as long as they are conductive materials.

The negative electrode 22 includes a negative electrode current collector 22A and two negative electrode active material layers 22B provided on both surfaces of the negative electrode current collector 22A, for example, as illustrated in FIG. 2. However, only one negative electrode active material layers 22B may be provided on one surface of the negative electrode current collector 22A.

The negative electrode current collector 22A contains any one kind or two or more kinds among, for example, conductive materials such as copper, aluminum, nickel, and stainless steel. This negative electrode current collector 22A may be a single layer or a multilayer.

It is preferable that the surface of the negative electrode current collector 22A is roughened. This is because the close contact property of the negative electrode active material layer 22B with respect to the negative electrode current collector 22A is improved by the so-called anchor effect. In this case, the surface of the negative electrode current collector 22A may be roughened at least in a region facing the negative electrode active material layer 22B. Examples of the roughening method include a method in which fine particles are formed by utilizing an electrolytic treatment. In the electrolytic treatment, fine particles are formed on the surface of the negative electrode current collector 22A in an electrolytic bath by an electrolytic method, and thus irregularities are provided on the surface of the negative electrode current collector 22A. A copper foil fabricated by an electrolytic method is generally called an electrolytic copper foil.

The negative electrode active material layer 22B contains a negative electrode active material capable of storing and releasing lithium and a negative electrode conductive agent. The kind of negative electrode active material may be only one kind or two or more kinds as well as the kind of negative electrode conductive agent may be only one kind or two or more kinds. However, the negative electrode active material layer 22B may further contain any one kind or two or more kinds among other materials such as a negative electrode binder.

The negative electrode active material is a plurality of particulate negative electrode active materials. Specifically, the negative electrode active material contains a plurality of primary negative electrode active material particles and a plurality of secondary negative electrode active material particles.

The "primary negative electrode active material particles" are primary particles among a plurality of particulate negative electrode active materials as described above. In addition, the "secondary negative electrode active material particles" are secondary particles among a plurality of particulate negative electrode active materials as well as are an assembly (aggregate) of a plurality of primary particles as described above.

This negative electrode active material (a plurality of primary negative electrode active material particles and a plurality of secondary negative electrode active material particles) contains a lithium titanium composite oxide. Specifically, the lithium titanium composite oxide includes any one kind or two or more kinds among compounds represented by respective Formulas (1) to (3). Incidentally, the kind of lithium titanium composite oxide contained in the plurality of primary negative electrode active material particles and the kind of lithium titanium composite oxide contained in the plurality of secondary negative electrode active material particles may be the same as or different from each other.

$$\text{Li}[\text{Li}_x\text{M1}_{(1-3x)/2}\text{Ti}_{(3+x)/2}]\text{O}_4 \quad (1)$$

(M1 represents at least one kind among magnesium (Mg), calcium (Ca), copper (Cu), zinc (Zn), and strontium (Sr). x satisfies 0<x≤1/3.)

$$\text{Li}[\text{Li}_y\text{M2}_{1-3y}\text{Ti}_{1+2y}]\text{O}_4 \quad (2)$$

(M2 represents at least one kind among aluminum (Al), scandium (Sc), chromium (Cr), manganese (Mn), iron (Fe), germanium (Ge), gallium (Ga), and yttrium (Y). y satisfies 0<y≤1/3.)

$$\text{Li}[\text{Li}_{1/3}\text{M3}_z\text{Ti}_{(5/3)-z}]\text{O}_4 \quad (3)$$

(M3 represents at least one kind among vanadium (V), zirconium (Zr), and niobium (Nb). z satisfies 0<z<2/3.)

Hereinafter, the compound represented by Formula (1) is referred to as the "first lithium titanium composite oxide", the compound represented by Formula (2) is referred to as the "second lithium titanium composite oxide", and the compound represented by Formula (3) is referred to as the "third lithium-titanium composite oxide", respectively.

In addition, the first lithium titanium composite oxide, the second lithium titanium composite oxide, and the third lithium titanium composite oxide are collectively referred to as "lithium titanium composite oxide".

The lithium titanium composite oxide may include only any one kind among the first lithium titanium composite oxide, the second lithium titanium composite oxide, and the third lithium titanium composite oxide, may include two kinds in an arbitrary combination, or may include all of the three kinds.

Specific examples of the first lithium titanium composite oxide include $\text{Li}_{3.75}\text{Ti}_{4.875}\text{Mg}_{0.375}\text{O}_{12}$. Specific examples of the second lithium titanium composite oxide include LiCr- TiO$_4$. Specific examples of the third lithium titanium composite oxide include Li$_4$Ti$_5$O$_{12}$ and Li$_4$Ti$_{4.95}$Nb$_{0.05}$O$_{12}$.

Among these, the lithium titanium composite oxide is preferably the third lithium titanium composite oxide. This is because the overvoltage (load potential to be described later) in a case in which the secondary battery is charged under a high load charging condition decreases.

In particular, it is preferable that the lithium titanium composite oxide further contains any one kind or two or more kinds among other elements. More specifically, it is preferable that the lithium titanium composite oxide contains other elements fixed on the surface of any one kind or two or more kinds among compounds represented by the respective Formulas (1) to (3). The kind of other elements is not particularly limited, but other elements are metal elements other than titanium. Specific examples of other elements include magnesium, zinc, aluminum, gallium, and indium, and the content of other elements in the lithium titanium composite oxide is, for example, 0.001 mol % to 5 mol %. This is because the overvoltage in a case in which the secondary battery is charged under a high load charging condition further decreases. Incidentally, the method for containing other elements in the lithium titanium composite oxide will be described later.

Here, in the negative electrode active material containing a plurality of primary negative electrode active material particles and a plurality of secondary negative electrode active material particles, the particle size distribution with regard to the plurality of primary negative electrode active material particles and the plurality of secondary negative electrode active material particles is optimized.

Specifically, the proportion of the number of the plurality of primary negative electrode active material particles to the sum of the number of the plurality of primary negative electrode active material particles and the number of the plurality of secondary negative electrode active material particles, namely, the particle size proportion (%) is 95% or more. This particle size proportion is calculated by particle size proportion (%)=[number of plurality of primary negative electrode active material particles/(number of plurality of primary negative electrode active material particles+number of plurality of secondary negative electrode active material particles)]×100.

For this reason, most of the plurality of particulate negative electrode active materials (the plurality of primary negative electrode active material particles and the plurality of secondary negative electrode active material particles) are a plurality of primary negative electrode active material particles. This is because the peel strength of the negative electrode active material layer 22B increases since the close contact force of the negative electrode active material layer 22B with respect to the negative electrode current collector 22A is improved as the plurality of primary negative electrode active material particles are likely to be bound to each other with the negative electrode binder interposed therebetween. Hence, even when charging and discharging is repeated, the negative electrode active material layer 22B is less likely to collapse as well as the negative electrode active material layer 22B is less likely to peel off from the negative electrode current collector 22A, and thus the discharge capacity is less likely to decrease.

In detail, the particle size proportion is not sufficiently large, and thus the negative electrode active material layer 22B is formed mainly as the plurality of secondary negative electrode active material particles are bound to each other with the negative electrode binder interposed therebetween in a case in which the number of the plurality of primary negative electrode active material particles is too small. In this case, the number of locations (binding sites) at which the plurality of secondary negative electrode active material particles are bound to each other with the negative electrode binder interposed therebetween is not sufficiently large, and thus the plurality of secondary negative electrode active material particles are less likely to be sufficiently bound to each other with the negative electrode binder interposed therebetween. In addition, the negative electrode binder easily penetrates into the secondary negative electrode active material particles, thus the negative electrode binder is less likely to sufficiently exert the binding function, as a result, the plurality of secondary negative electrode active material particles are fundamentally less likely to be bound to each other with the negative electrode binder interposed therebetween. Hence, the close contact force of the negative electrode active material layer 22B with respect to the negative electrode current collector 22A is insufficient, as a result, the peel strength of the negative electrode active material layer 22B decreases.

On the other hand, the particle size proportion is sufficiently large, and thus the negative electrode active material layer 22B is formed mainly as the plurality of primary negative electrode active material particles are bound to each other with the negative electrode binder interposed therebetween in a case in which the number of the plurality of primary negative electrode active material particles is sufficiently large. In this case, the number of locations (binding sites) at which the plurality of primary negative electrode active material particles are bound to each other with the negative electrode binder interposed therebetween is sufficiently large, and thus the plurality of primary negative electrode active material particles are likely to be sufficiently bound to each other with the negative electrode binder interposed therebetween. Moreover, the negative electrode binder hardly penetrates into the primary negative electrode active material particles, thus the negative electrode binder is likely to sufficiently exert the binding function, as a result, the plurality of primary negative electrode active material particles are fundamentally likely to be bound to each other with the negative electrode binder interposed therebetween. Hence, the close contact force of the negative electrode active material layer 22B with respect to the negative electrode current collector 22A sufficiently increases, as a result, the peel strength of the negative electrode active material layer 22B is secured.

This particle size proportion is calculated, for example, according to the procedure to be described below. First, the cross section of the negative electrode active material layer 22B is observed under a scanning electron microscope and the like. The conditions such as observation range and observation magnification can be arbitrarily set. Subsequently, the number of primary negative electrode active material particles and the number of secondary negative electrode active material particles are counted based on the observation result (photomicrograph) of the cross section of the negative electrode active material layer 22B. Finally, it is calculated that particle size proportion (%)=[number of plurality of primary negative electrode active material particles/(number of plurality of primary negative electrode active material particles+number of plurality of secondary negative electrode active material particles)]×100. Incidentally, the number of primary negative electrode active material particles and the number of secondary negative electrode active material particles may be each counted manually or automatically using image processing software and the like.

Moreover, in the negative electrode active material containing a plurality of primary negative electrode active material particles, the average particle size of the plurality of primary negative electrode active material particles is optimized. Specifically, the median diameter D50 of the plurality of primary negative electrode active material particles is 0.1 μm to 1 μm or less.

For this reason, the average particle size of the plurality of primary negative electrode active material particles is set to be sufficiently small in a case in which the particle size proportion is sufficiently large as described above. This is because the binding sites at which the plurality of primary negative electrode active material particles are bound to each other with the negative electrode binder interposed therebetween further increases and thus the close contact force of the negative electrode active material layer 22B with respect to the negative electrode current collector 22A is improved. This further increases the peel strength of the negative electrode active material layer 22B.

Incidentally, the negative electrode active material layer 22B may further contain any one kind or two or more kinds among other negative electrode active materials capable of storing and releasing lithium in addition to the negative electrode active material (the plurality of primary negative electrode active material particles and the plurality of secondary negative electrode active material particles) described above.

Examples of other negative electrode active materials include a carbon material. This is because the crystal structure of the carbon material hardly changes at the time of storage and release of lithium and thus a high energy density is stably attained. In addition, this is because a carbon material also functions as a negative electrode conductive agent and thus the conductivity of the negative electrode active material layer 22B is improved.

Examples of the carbon material include graphitizable carbon, non-graphitizable carbon, and graphite. However, the spacing of (002) plane of non-graphitizable carbon is preferably 0.37 nm or more as well as the spacing of (002) plane of graphite is preferably 0.34 nm or less.

More specific examples of the carbon material include pyrolytic carbons, cokes, glassy carbon fibers, organic polymer compound fired bodies, activated carbon, and carbon blacks. These cokes include pitch coke, needle coke, petroleum coke and the like. An organic polymer compound fired body is a fired product obtained by firing (carbonizing) a polymer compound such as a phenol resin and a furan resin at a proper temperature. In addition to these, the carbon material may be, for example, low crystalline carbon subjected to a heat treatment at a temperature of about 1000° C. or less or amorphous carbon. Incidentally, the shape of the carbon material may be any of a fibrous shape, a spherical shape, a granular shape, and a scale shape.

In addition, other negative electrode active materials are a metal-based material. This "metal-based material" is the generic term for materials containing any one kind or two or more kinds among metal elements and metalloid elements as constituent elements. This is because a high energy density is attained. However, the lithium titanium composite oxide described above is excluded from the metal-based material to be described here.

The metal-based material may be a simple substance, an alloy, a compound, two or more kinds among these, or a material having phases of one kind or two or more kinds among these at least at a part. However, the "alloy" described here includes a material containing one or more kinds of metal elements and one or more kinds of metalloid elements in addition to a material composed of two or more kinds of metal elements as well as the "alloy" may contain a nonmetallic element. The construction of this metal-based material is, for example, a solid solution, a eutectic (eutectic mixture), an intermetallic compound, and a material in which two or more kinds among these coexist.

The metal element is, for example, any one kind or two or more kinds among the metal elements capable of forming an alloy with lithium as well as the metalloid element is, for example, any one kind or two or more kinds among metalloid elements capable of forming an alloy with lithium. Specific examples of the metal element and the metalloid element include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among these, either or both of silicon and tin are preferable. This is because each of silicon and tin exhibits property of easily storing and releasing lithium and thus a significantly high energy density is attained.

The material containing either or both of silicon and tin as a constituent element may be a simple substance of silicon, an alloy of silicon, a compound of silicon, a simple substance of tin, an alloy of tin, a compound of tin, two or more kinds among these, or a material having phases of one kind or two or more kinds among these at least at a part. However, the "simple substance" described here is a simple substance (which may contain a small amount of impurities) in a general sense to the utmost, and thus the purity of the simple substance is not necessarily limited to 100%.

The alloy of silicon contains any one kind or two or more kinds among tin, nickel, copper, iron, cobalt, manganese, zinc, indium, silver, titanium, germanium, bismuth, antimony, chromium, and the like, for example, as constituent elements other than silicon. The compound of silicon contains any one kind or two or more kinds among carbon, oxygen and the like, for example, as constituent elements other than silicon. Incidentally, the compound of silicon may contain any one kind or two or more kinds among a series of elements described in the alloy of silicon, for example, as constituent elements other than silicon.

Specific examples of the alloy and compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v(0<v\leq2)$, and $LiSiO$. Incidentally, v in $SiO_v$ may be $0.2<v<1.4$.

The alloy of tin contains any one kind or two or more kinds among silicon, nickel, copper, iron, cobalt, manganese, zinc, indium, silver, titanium, germanium, bismuth, antimony, chromium, and the like, for example, as constituent elements other than tin. The compound of tin contains any one kind or two or more kinds among carbon, oxygen and the like, for example, as constituent elements other than tin. Incidentally, the compound of tin may contain any one kind or two or more kinds among a series of elements described in the alloy of tin, for example, as constituent elements other than tin.

Specific examples of the alloy and compound of tin include $SnO_w$ (0<w<2), $SnSiO_3$, $LiSnO$, and $Mg_2Sn$.

In particular, it is preferable that the material containing tin as a constituent element is, for example, a tin-containing material. This "tin-containing material" is the generic term for materials containing a second constituent element and a third constituent element together with tin which is the first constituent element.

The second constituent element includes any one kind or two or more kinds among, for example, cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes any one kind or two or more kinds among, for example, boron, carbon, aluminum, and phosphorus. This is because a high battery capacity, excellent cycle characteristics and the like are attained.

Among these, it is preferable that the tin-containing material is a tin cobalt carbon-containing material. This "tin cobalt carbon-containing material" is the generic term for materials containing tin, cobalt, and carbon as constituent elements. In this tin cobalt carbon-containing material, for example, the carbon content is 9.9% by mass to 29.7% by mass and the proportion (Co/(Sn+Co)) of tin and cobalt content is 20% by mass to 70% by mass. This is because a high energy density is attained.

It is preferable that the tin cobalt carbon-containing material has a phase containing tin, cobalt, and carbon and the phase is low crystalline or amorphous. This phase is a phase (reaction phase) capable of reacting with lithium, and thus excellent characteristics are attained by the presence of this reaction phase. It is preferable that the half value width (diffraction angle 2θ) of the diffraction peak attained by X-ray diffraction of this reaction phase is 1° or more when CuKα ray is used as the specific X-ray as well as the insertion speed is set to 1°/min. This is because lithium is more smoothly stored and released and the reactivity with the electrolytic solution decreases. Incidentally, there is also a case in which the tin cobalt carbon-containing material has a phase containing a simple substance or a part of the respective constituent elements in addition to a low crystalline or amorphous phase.

It can be easily judged whether or not the diffraction peak attained by X-ray diffraction is a diffraction peak corresponding to a reaction phase when the X-ray diffraction charts attained before and after the electrochemical reaction with lithium are compared to each other. For example, when the position of the diffraction peak changes before and after the electrochemical reaction with lithium, the diffraction peak is a diffraction peak corresponding to a reaction phase. In this case, for example, a diffraction peak of a low crystalline or amorphous reaction phase is detected at between 2θ=20° and 2θ=50°. It is considered that this reaction phase contains, for example, the respective constituent elements described above and is low crystallized or amorphized mainly by the presence of carbon.

In the tin cobalt carbon-containing material, it is preferable that at least a part of carbon which is a constituent element is bonded to a metal element and a metalloid element which are other constituent elements. This is because aggregation of tin and the like is suppressed as well as crystallization of tin and the like is suppressed.

The bonding state of elements can be confirmed using, for example, X-ray photoelectron spectroscopy (XPS). In a commercially available apparatus, for example, Al-Kα ray or Mg-Kα ray is used as the soft X-ray. In a case in which a part or all of carbon is bonded to a metal element, a metalloid element or the like, the peak of the synthetic wave at the carbon 1s orbitals (C1s) is detected in a region lower than 284.5 eV. Incidentally, the energy calibration is performed so that the peak at the gold atom 4f orbitals (Au4f) is attained at 84.0 eV.

Surface-contaminated carbon is usually present on the surface of a substance, and thus the C1s peak energy of the surface-contaminated carbon is set to 284.8 eV, and this peak is used as an energy reference. In XPS measurement, the waveform of the C1s peak is attained in a state including the peak attributed to the surface-contaminated carbon and the peak attributed to the carbon in the tin cobalt carbon-containing material. For this reason, both peaks are separated from each other by being analyzed using, for example, commercially available software. In the analysis of waveform, the position of the main peak present on the lowest bound energy side is used as the energy reference (284.8 eV).

This tin cobalt carbon-containing material is not limited to a material of which the constituent elements are only tin, cobalt, and carbon. This tin cobalt carbon-containing material may further contain any one kind or two or more kinds among silicon, iron, nickel, chromium, indium, niobium, germanium, titanium, molybdenum, aluminum, phosphorus, gallium, bismuth and the like as constituent elements in addition to tin, cobalt, and carbon, for example.

In addition to the tin cobalt carbon-containing material, a tin cobalt iron carbon-containing material is also preferable. This "tin cobalt iron carbon-containing material" is the generic term for materials containing tin, cobalt, iron, and carbon as constituent elements.

The composition of this tin cobalt iron carbon-containing material is arbitrary. As an example, in a case in which the iron content is set to be low, the carbon content is 9.9% by mass to 29.7% by mass, the iron content is 0.3% by mass to 5.9% by mass, and the proportion (Co/(Sn+Co)) of tin and cobalt content is 30% by mass to 70% by mass. In addition, in a case in which the iron content is set to be high, the carbon content is 11.9% by mass to 29.7% by mass, the proportion ((Co+Fe)/(Sn+Co+Fe)) of tin, cobalt, and iron content is 26.4% by mass to 48.5% by mass, and the proportion (Co/(Co+Fe)) of cobalt and iron content is 9.9% by mass to 79.5% by mass. This is because a high energy density is attained.

Incidentally, the details (half value width and the like) with regard to the physical properties of tin cobalt iron carbon-containing material are, for example, similar to the details with regard to the physical properties of tin cobalt carbon-containing material described above.

In addition, the other negative electrode active materials may be, for example, a metal oxide and a polymer compound. Examples of the metal oxides include iron oxide, ruthenium oxide, and molybdenum oxide. Examples of the polymer compounds include polyacetylene, polyaniline, and polypyrrole.

Incidentally, the negative electrode active material layer 22B is formed by any one kind or two or more kinds of methods among, for example, a coating method, a vapor phase method, a liquid phase method, a thermal spray method, and a firing method (sintering method).

The coating method is, for example, a method in which the negative electrode current collector 22A is coated with a solution in which a mixture of a negative electrode active material, a negative electrode binder and the like is dissolved or dispersed in an organic solvent and the like.

The vapor phase method is, for example, a physical deposition method and a chemical deposition method, and more specific examples thereof include a vacuum vapor deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which a negative electrode active material in molten or semi-molten state is sprayed onto the negative electrode current collector 22A. The firing method is, for example, a method in which a solution is applied to the negative electrode current collector 22A by a coating method and then subjected to a heat treatment at a temperature higher than the melting point of the negative electrode binder and the like. Specific examples of the firing method include an atmosphere firing method, a reaction firing method, and a hot press firing method.

In this secondary battery, it is preferable that the electrochemical equivalent of the negative electrode material capable of storing and releasing lithium is greater than the electrochemical equivalent of the positive electrode in order to prevent unintentional precipitation of lithium metal on the surface of the negative electrode 22 during charging as described above. In addition, when the open circuit voltage at full charging (namely, battery voltage) is 4.25 V or more, the amount of lithium released per unit mass increases as compared to a case in which the open circuit voltage at full charging is 4.20 V even when the same positive electrode active material is used, and it is thus preferable that the amount of the positive electrode active material and the amount of the negative electrode active material are adjusted in consideration of this. A high energy density is thus attained.

The details of the negative electrode binder are, for example, similar to the details of the positive electrode binder.

The negative electrode conductive agent contains a carbon material and more specifically contains a plurality of flaky carbon materials. This is because an electron conduction path utilizing a flaky carbon material is likely to be formed inside the negative electrode active material layer 22B and the electric resistance of the negative electrode active material layer 22B thus decreases. This "electron conduction path" is an electron conduction path between a plurality of primary negative electrode active material particles, an electron conduction path between a plurality of secondary negative electrode active material particles, and an electron conduction path between a plurality of primary negative electrode active material particles and a plurality of secondary negative electrode active material particles.

The kind of flaky carbon material is not particularly limited, but examples thereof include flaky graphite. This is because an electron conduction path is likely to be formed inside the negative electrode active material layer 22B as well as the electric resistance of the negative electrode active material layer 22B sufficiently decreases.

Here, the shape of the flaky carbon material is optimized in the negative electrode conductive agent containing a flaky carbon material.

Specifically, the average aspect ratio of the plurality of flaky carbon materials is 6 to 8.5. This is because an electron conduction path utilizing a flaky carbon material is likely to be formed inside the negative electrode active material layer 22B and the electric resistance of the negative electrode active material layer 22B thus further decreases. This is also because the overvoltage in a case in which the secondary battery is charged under a high load charging condition further decreases.

This average aspect ratio is calculated, for example, according to the procedure to be described below. First, the cross section of the negative electrode active material layer 22B is observed under a scanning electron microscope and the like. The conditions such as observation range and observation magnification can be arbitrarily set. Subsequently, the aspect ratio=major axis dimension/minor axis dimension is calculated by measuring each of the major axis dimension and the minor axis dimension for each of the flaky carbon materials based on the observation result (photomicrograph) of the cross section of the negative electrode active material layer 22B. In this case, the number of aspect ratios calculated is set to 100, that is, the number of flaky carbon materials of which the aspect ratio is calculated is set to 100. Incidentally, each of the major axis dimension and the minor axis dimension may be measured manually or automatically using image processing software and the like. Finally, the average aspect ratio is determined by calculating the average value of 100 aspect ratios.

In addition, in the negative electrode active material layer 22B containing a plurality of flaky carbon materials as the negative electrode conductive agent, the content of the negative electrode conductive agent is optimized.

Specifically, the proportion of the weight of the negative electrode conductive agent with respect to the weight of the negative electrode active material layer 22B, namely, the weight proportion (% by weight) is 2.5% by weight or less and preferably 2% by weight or less. This is because an electron conduction path utilizing a flaky carbon material is likely to be formed inside the negative electrode active material layer 22B and the electric resistance of the negative electrode active material layer 22B thus further decreases. This is also because the overvoltage in a case in which the secondary battery is charged under a high load charging condition further decreases. This weight proportion is calculated by weight proportion (%)=(weight of negative electrode conductive agent/weight of negative electrode active material layer 22B)×100. The lower limit value of the weight proportion is not particularly limited and is, for example, 0.1% by weight.

Incidentally, the negative electrode conductive agent may further contain any one kind or two or more kinds among other conductive materials in addition to the flaky carbon material described above. The details of other conductive materials are, for example, similar to the details (conductive material) of the positive electrode conductive agent.

The separator 23 is interposed between the positive electrode 21 and the negative electrode 22, for example, as illustrated in FIG. 2. By this, the separator 23 allows lithium ions to pass through while preventing a short circuit of current due to contact between the positive electrode 21 and the negative electrode 22.

This separator 23 includes, for example, any one kind or two or more kinds among porous films of synthetic resins, ceramics and the like and may be a laminated film of two or more kinds of porous films. Examples of the synthetic resins include polytetrafluoroethylene, polypropylene, and polyethylene.

In particular, the separator 23 may include, for example, the above-described porous film (base material layer) and a polymer compound layer provided on one or both surfaces of the base material layer. This is because the close contact property of the separator 23 with respect to the positive electrode 21 is improved as well as the close contact property of the separator 23 with respect to the negative electrode 22 is improved, and thus the distortion of the wound electrode body 20 is suppressed. By this, the decomposition reaction of the electrolytic solution is suppressed as well as the leakage of the electrolytic solution impregnated in the base material layer is suppressed, and thus the resistance hardly increases even when charging and discharging is repeated as well as battery swelling is suppressed.

The polymer compound layer contains, for example, any one kind or two or more kinds among polymer compounds such as polyvinylidene fluoride. This is because a polymer compound has excellent physical strength as well as is electrochemically stable. In the case of forming this polymer compound layer, for example, a solution in which a polymer compound is dissolved in an organic solvent and the like is applied to the base material layer and then the base material layer is dried. Alternatively, the base material layer may be immersed in a solution and then dried, for example.

Incidentally, the polymer compound layer may contain any one kind or two or more kinds among, for example, insulating particles such as inorganic particles. Examples of the kind of inorganic particles include aluminum oxide and aluminum nitride.

The electrolytic solution contains a solvent and an electrolyte salt. However, the electrolytic solution may further contain any one kind or two or more kinds among other materials such as additives.

The solvent contains any one kind or two or more kinds among non-aqueous solvents such as organic solvents. The electrolytic solution containing a non-aqueous solvent is a so-called non-aqueous electrolytic solution.

Examples of the non-aqueous solvent include a cyclic carbonate ester, a chain carbonate ester, a lactone, a chain carboxylate ester, and a nitrile (mononitrile). This is because an excellent battery capacity, excellent cycle characteristics, excellent storage characteristics and the like are attained.

Examples of the cyclic carbonate ester include ethylene carbonate, propylene carbonate, and butylene carbonate. Examples of the chain carbonate ester include dimethyl carbonate, diethyl carbonate, ethyl methyl carbonate, and methyl propyl carbonate. Examples of the lactone include γ-butyrolactone and γ-valerolactone. Examples of the chain carboxylate ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

In addition to these, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because the same advantages are attained.

Among these, it is preferable that the non-aqueous solvent contains either or both of a cyclic carbonate ester and a chain carbonate ester, and more specifically it is preferable that the non-aqueous solvent contains any one kind or two or more kinds among ethylene carbonate, propylene carbonate, dimethyl carbonate, diethyl carbonate, ethyl methyl carbonate and the like. This is because a high battery capacity, excellent cycle characteristics, excellent storage characteristics and the like are attained.

In particular, it is preferable that the non-aqueous solvent contains both a cyclic carbonate ester and a chain carbonate ester, and more specifically it is preferable that the non-aqueous solvent contains combinations of solvents having a high viscosity (high permittivity) (for example, relative permittivity ε≥30) such as ethylene carbonate and propylene carbonate with solvents having a low viscosity (for example, viscosity ≤1 mPa·s) such as dimethyl carbonate, ethyl methyl carbonate, and diethyl carbonate. This is because the dissociation property of the electrolyte salt and the mobility of ions are improved.

Among these, the cyclic carbonate ester is preferably propylene carbonate. This is because the secondary battery can be operated in a low temperature environment since the melting point of propylene carbonate is low. In addition, it is preferable that the chain carbonate ester is not diethyl carbonate, and more specifically it is preferable that the chain carbonate is dimethyl carbonate and ethyl methyl carbonate. This is because the dissociation property of the electrolyte salt and the mobility of ions are improved since the viscosity of these is low. Moreover, this is because the same advantages as those from propylene carbonate described above are attained from these.

In addition, examples of the non-aqueous solvent include an unsaturated cyclic carbonate ester, a halogenated carbonate ester, a sulfonate ester, an acid anhydride, a dicyano compound (dinitrile compound), a diisocyanate compound, a phosphate ester, and a chain compound having a carbon-carbon triple bond. This is because the chemical stability of the electrolytic solution is improved.

An unsaturated cyclic carbonate ester is a cyclic carbonate ester having one or two or more unsaturated bonds (carbon-carbon double bonds or carbon-carbon triple bonds). Examples of the unsaturated cyclic carbonate ester include a vinylene carbonate-based compound, a vinyl ethylene carbonate-based compound, and a methylene ethylene carbonate-based compound.

Specific examples of the vinylene carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

Specific examples of the vinyl ethylene carbonate-based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

Specific examples of the methylene ethylene carbonate-based compound include methylene ethylene carbonate (4-methylene-1,3-dioxolan-2-one), 4,4-dimethyl-5-methylene-1,3-dioxolan-2-one, and 4,4-diethyl-5-methylene-1,3-dioxolan-2-one.

Among these, the vinylene carbonate-based compound is preferably vinylene carbonate. The vinyl ethylene carbonate-based compound is preferably vinyl ethylene carbonate. The methylene ethylene carbonate-based compound is preferably methylene ethylene carbonate. In other words, it is preferable that the unsaturated cyclic carbonate ester contains any one kind or two or more kinds among vinylene carbonate, vinyl ethylene carbonate, and methylene ethylene carbonate. This is because the chemical stability of the electrolytic solution is further improved.

The content of the unsaturated cyclic carbonate ester in the non-aqueous solvent is not particularly limited and is, for example, 0.001% by weight to 2.5% by weight. This is because the chemical stability of the electrolytic solution is sufficiently improved.

A halogenated carbonate ester is are a cyclic or chain carbonate ester containing one or two or more halogen elements as a constituent element. In a case in which the halogenated carbonate ester contains two or more halogens as a constituent element, the kind of the two or more halogens may be one kind or two or more kinds. Examples of the halogenated cyclic carbonate ester include 4-fluoro- 1,3-dioxolan-2-one and 4,5-difluoro-1,3-dioxolan-2-one. Examples of the halogenated chain carbonate ester include fluoromethyl methyl carbonate, bis(fluoromethyl) carbonate, and difluoromethyl methyl carbonate. The content of halogenated carbonate ester in the non-aqueous solvent is not particularly limited and is, for example, 0.01% by weight to 50% by weight.

Examples of the sulfonate ester include a monosulfonate ester and a disulfonate ester. The content of the sulfonate ester in the non-aqueous solvent is not particularly limited and is, for example, 0.01% by weight to 10% by weight.

The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved in the middle. The disulfonate ester may be a cyclic disulfonate ester or a chain disulfonate ester.

Examples of the acid anhydride include carboxylic anhydrides, disulfonic anhydrides, and carboxylic sulfonic anhydrides. Examples of the carboxylic anhydrides include anhydrous succinic acid, anhydrous glutaric acid, and anhydrous maleic acid. Examples of the disulfonic anhydrides include anhydrous ethanedisulfonic acid and anhydrous propanedisulfonic acid. Examples of the carboxylic sulfonic anhydrides include anhydrous sulfobenzoic acid, anhydrous sulfopropionic acid, and anhydrous sulfobutyric acid. The content of acid anhydride in the non-aqueous solvent is not particularly limited and is, for example, 0.5% by weight to 5% by weight.

A dinitrile compound is, for example, a compound represented by NC—R1-CN (R1 represents either of an alkylene group or an arylene group).

Examples of this dinitrile compound include succinonitrile (NC—$C_2H_4$—CN), glutaronitrile (NC—$C_3H_6$—CN), adiponitrile (NC—$C_4H$—CN), and phthalonitrile (NC—$C_6H_4$—CN). The content of dinitrile compound in the non-aqueous solvent is not particularly limited and is, for example, 0.5% by weight to 5% by weight.

A diisocyanate compound is, for example, a compound represented by OCN—R2-NCO (R2 represents either of an alkylene group or an arylene group). Examples of this diisocyanate compound include hexamethylene diisocyanate (OCN—$C_6H_{12}$—NCO). The content of diisocyanate compound in the non-aqueous solvent is not particularly limited and is, for example, 0.5% by weight to 5% by weight.

Examples of the phosphate ester include trimethyl phosphate and triethyl phosphate. The content of the phosphate ester in the non-aqueous solvent is not particularly limited and is, for example, 0.5% by weight to 5% by weight.

A chain compound having a carbon-carbon triple bond is a chain compound having one or two or more carbon-carbon triple bonds (—C≡C—). Examples of this chain compound having a carbon-carbon triple bond include propargyl methyl carbonate (CH≡C—$CH_2$—O—C(=O)—O—$CH_3$) and propargyl methanesulfonate (CH≡C—$CH_2$—O—S(=O)$_2$—$CH_3$). The content of chain compound having a carbon-carbon triple bond in the non-aqueous solvent is not particularly limited and is, for example, 0.5% by weight to 5% by weight.

The electrolyte salt contains, for example, any one kind or two or more kinds among salts such as lithium salts. However, the electrolyte salt may contain, for example, salts other than lithium salts. Examples of the salts other than lithium salts include salts of light metals other than lithium.

Examples of the lithium salts include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium bis(fluorosulfonyl)amide (LiN(SO$_2$F)$_2$), lithium bis(trifluoromethanesulfonyl)amide (LiN(CF$_3$SO$_2$)$_2$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), and lithium bromide (LiBr).

This is because an excellent battery capacity, excellent cycle characteristics, excellent storage characteristics and the like are attained.

Among these, any one kind or two or more kinds among lithium hexafluorophosphate, lithium tetrafluoroborate, lithium perchlorate, and lithium hexafluoroarsenate are preferable and lithium hexafluorophosphate is more preferable. This is because the internal resistance decreases.

The content of electrolyte salt is not particularly limited but, among others, is preferably 0.3 mol/kg to 3.0 mol/kg with respect to the solvent. This is because high ionic conductivity is attained.

Subsequently, the operation of the secondary battery will be described. This secondary battery operates, for example, as follows.

At the time of charging, lithium ions are released from the positive electrode 21 as well as the lithium ions are stored in the negative electrode 22 via the electrolytic solution. On the other hand, at the time of discharging, lithium ions are released from the negative electrode 22 as well as the lithium ions are stored in the positive electrode 21 via the electrolytic solution.

Subsequently, the method for manufacturing a secondary battery will be described. This secondary battery is manufactured, for example, according to the following procedure.

Incidentally, the details of each of the negative electrode active material (the plurality of primary negative electrode active material particles and the plurality of secondary negative electrode active material particles) and the negative electrode conductive agent (the plurality of flaky carbon materials) have already been described, thus the description thereof will be omitted below.

In the case of fabricating the positive electrode 21, first, a positive electrode active material, a positive electrode binder, a positive electrode conductive agent and the like are mixed together and then the mixture is stirred to obtain a positive electrode mixture. Subsequently, the positive electrode mixture is added to an organic solvent and the like, and then the organic solvent is stirred to prepare a paste-like positive electrode mixture slurry. Finally, the positive electrode mixture slurry is applied to both surfaces of the positive electrode current collector 21A and then dried to form the positive electrode active material layer 21B. Thereafter, the positive electrode active material layer 21B is compression-molded using a roll press and the like. In this case, the positive electrode active material layer 21B may be heated, or compression molding may be repeated plural times.

In the case of fabricating the negative electrode 22, the negative electrode active material layer 22B is formed on both surfaces of the negative electrode current collector 22A according to the same procedure as the manufacturing procedure of the positive electrode 21 described above. Specifically, a negative electrode active material containing lithium titanium composite oxide, a negative electrode conductive agent, a negative electrode binder and the like are mixed together and then the mixture is stirred to obtain a negative electrode mixture. Subsequently, the negative electrode mixture is added to an organic solvent and the like, and then the organic solvent and the like are stirred to prepare a paste-like negative electrode mixture slurry. Finally, the negative electrode mixture slurry is applied to both surfaces of the negative electrode current collector 22A and then dried.

Here, in the negative electrode active material at the stage before being prepared into the negative electrode mixture, the number of plurality of secondary negative electrode active material particles is sufficiently large, and thus the particle size proportion may be less than 95%. This is because the bulk density of the negative electrode active material increases and the handleability of the negative electrode active material is thus improved. In this case, the plurality of secondary negative electrode active material particles are pulverized (into primary particles) at the time of preparation of the negative electrode mixture by adjusting the time required for preparing the negative electrode mixture, namely, the time required for mixing the negative electrode active material, the negative electrode conductive agent and the like. Specifically, as the time required for preparation of the negative electrode mixture is longer, the pulverization is promoted and thus the particle size proportion increases. By this, in the negative electrode mixture, the number of plurality of primary negative electrode active material particles sufficiently increased and thus the particle size proportion is 95% or more. Incidentally, the degree of pulverization can be confirmed, for example, based on the peel strength of the negative electrode active material layer 22B. In addition to this, the degree of pulverization can be confirmed, for example, based on the hardness of the negative electrode mixture.

Incidentally, in a case in which other elements are contained in the lithium titanium composite oxide, any one kind or two or more kinds of powders among the compounds represented by the respective Formulas (1) to (3) and any one kind or two or more kinds among the source materials are mixed together and then the mixture is subjected to a heat treatment. These "source materials" are materials to be sources of other elements.

The kind of source material is not particularly limited as long as it is a material which contains other elements as constituent elements as well as can be diffused in accordance with the heat treatment, and examples thereof include oxides containing other elements, hydroxides containing other elements, and metal salt compounds containing other elements. The details of the source material are as follows. The source material in a case in which the other element is magnesium is, for example, magnesium acetate ($Mg(CH_3COO)_2$). The source material in a case in which the other element is zinc is, for example, zinc acetate ($Zn(CH_3COO)_2$). The source material in a case in which the other element is aluminum is, for example, aluminum acetate ($Al(CH_3COO)_3$). The source material in a case in which the other element is gallium is, for example, gallium acetate ($Ga(CH_3COO)_3$). The source material in a case in which the other element is indium is, for example, indium acetate ($In(CH_3COO)_3$). However, the source material is not limited to acetate salts and may be sulfates and the like.

The mixing method may be a dry mixing method or a wet mixing method. In the dry mixing method, for example, any one kind or two or more kinds among a paint mixer, a Henschel mixer, an ultrasonic dispersion apparatus, a homo-mixer, a mortar, a ball mill, a centrifugal ball mill, a planetary ball mill, a vibrating ball mill, an attritor type high-speed ball mill, a bead mill, a roll mill and the like are used. In the wet mixing method, for example, a lithium composite oxide and a source material are added to a solvent such as an aqueous solvent, and then the solvent is stirred to prepare a slurry. Examples of the aqueous solvent include alcohols such as methanol, ethanol, and isopropyl alcohol in addition to pure water. Among these, the mixing method is preferably a wet mixing method. This is because other elements are easily diffused in the lithium composite oxide and thus likely to be uniformly distributed.

Incidentally, in the wet mixing method, a solution in which a source material is dissolved in a solvent may be prepared in advance and then used. Moreover, in the case of using a wet mixing method, the solvent may be removed by being evaporated before the heat treatment is performed.

The conditions such as treatment temperature and treatment time in the heat treatment are not particularly limited and can be thus arbitrarily set. By this heat treatment, other elements are fixed in the lithium composite oxide.

In the case of assembling a secondary battery, first, the positive electrode lead 25 is attached to the positive electrode current collector 21A by a welding method and the like as well as the negative electrode lead 26 is attached to the negative electrode current collector 22A by a welding method and the like. Subsequently, the positive electrode 21 and the negative electrode 22 are stacked with the separator 23 interposed therebetween, and then the positive electrode 21, the negative electrode 22, and the separator 23 are wound to form a wound body. Subsequently, the center pin 24 is inserted into a winding center 20C of the wound body.

Subsequently, the wound body is housed inside the battery can 11 while being sandwiched between the pair of insulating plates 12 and 13. In this case, the positive electrode lead 25 is attached to the safety valve mechanism 15 by a welding method and the like as well as the negative electrode lead 26 is attached to the battery can 11 by a welding method and the like. Subsequently, the electrolytic solution is injected into the battery can 11. By this, the wound body is impregnated with the electrolytic solution, and the wound electrode body 20 is thus formed. Finally, the battery lid 14, the safety valve mechanism 15, and the heat sensitive resistance element 16 are crimped to the opening end portion of the battery can 11 with the gasket 17 interposed therebetween.

By this, the wound electrode body 20 is enclosed inside the battery can 11, and a cylindrical type secondary battery is thus completed.

According to this cylindrical type secondary battery, the negative electrode 22 contains a plurality of primary negative electrode active material particles and a plurality of secondary negative electrode active material particles (lithium titanium composite oxide) as a negative electrode active material as well as contains a plurality of flaky carbon materials as a negative electrode conductive agent. Moreover, the conditions described above are satisfied with regard to each of the configuration (particle size proportion and median diameter D50) of the negative electrode active material and the configuration (average aspect ratio and weight proportion) of the negative electrode conductive agent. In this case, the peel strength of the negative electrode active material layer 22B increases and thus the discharge capacity is less likely to decrease even when charging and discharging is repeated as described above. Moreover, in the negative electrode active material layer 22B, an electron conduction path utilizing a flaky carbon material is likely to be formed and thus the electric resistance of the negative electrode active material layer 22B decreases as well as the overvoltage even when the secondary battery is charged under a high load charging condition decreases. Consequently, excellent battery characteristics can be attained.

In particular, when the lithium titanium composite oxide contains other elements such as magnesium and the content of other elements in the lithium titanium composite oxide is 0.001 mol % to 5 mol %, the above-described overvoltage further decreases and thus a higher effect can be attained.

Moreover, when the flaky carbon material contains flaky graphite, an electron conduction path is likely to be formed inside the negative electrode active material layer 22B as well as the electric resistance of the negative electrode active material layer 22B sufficiently decreases and thus a higher effect can be attained.

Moreover, when the positive electrode 21 contains a lithium-containing phosphate compound as a positive electrode active material, the battery characteristics of the secondary battery are stabilized, thus the lifetime of the secondary battery is prolonged, and a higher effect can be attained.

Moreover, when the electrolytic solution contains a cyclic carbonate ester and a chain carbonate ester and the cyclic carbonate ester contains propylene carbonate as well as the chain carbonate ester contains dimethyl carbonate and ethyl methyl carbonate, an advantage is attained with regard to the dissociation property of the electrolyte salt and the improvement in ion conductivity and thus a higher effect can be attained.

In addition, when the electrolytic solution contains an unsaturated cyclic carbonate ester and the unsaturated cyclic carbonate ester contains vinylene carbonate and the like, the chemical stability of the electrolytic solution is improved and thus a higher effect can be attained. In this case, the chemical stability of the electrolytic solution is further improved and thus a still higher effect can be attained when the content of unsaturated cyclic carbonate ester in the electrolytic solution is 0.001% by weight to 2.5% by weight.

Next, another secondary battery according to an embodiment of the present technology will be described. In the following description, the constituent elements of the cylindrical type secondary battery already described are referred to as needed.

Figure 3:
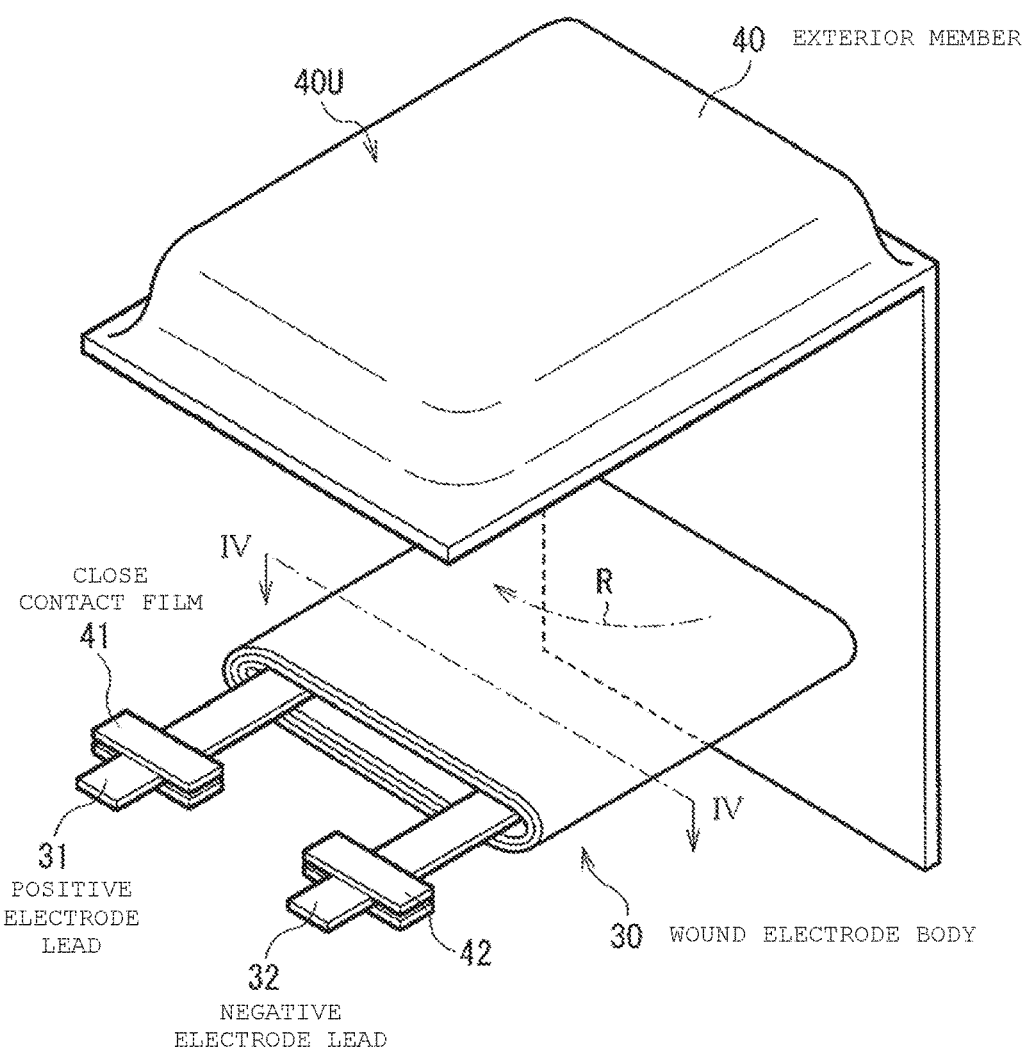
FIG. 3 is a perspective diagram illustrating the configuration of another secondary battery (laminated film type) according to an embodiment of the present technology.
Figure 4:
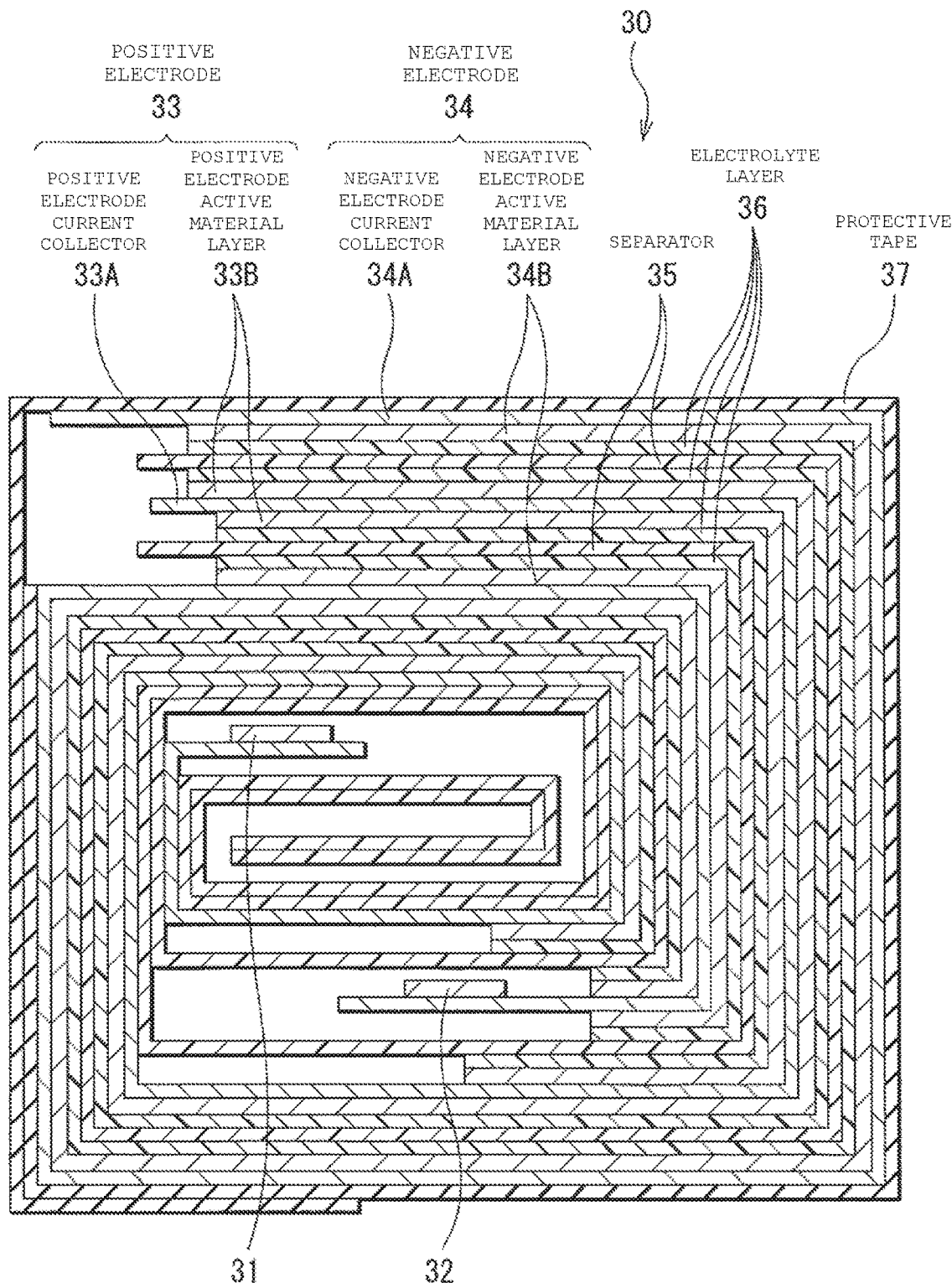
FIG. 4 is a cross-sectional diagram of a wound electrode body taken along the line IV-IV illustrated in FIG. 3.

FIG. 3 illustrates a perspective configuration of another secondary battery as well as FIG. 4 illustrates an enlarged cross-sectional configuration of a wound electrode body 30 taken along the line IV-IV illustrated in FIG. 3. Incidentally, a state in which the wound electrode body 30 and an exterior member 40 are distant from each other is illustrated in FIG. 3.

The secondary battery is a laminated film type secondary battery in which the wound electrode body 30 which is a battery element is housed inside the film-shaped exterior member 40 exhibiting flexibility (or plasticity), for example, as illustrated in FIG. 3.

The exterior member 40 is one sheet of film capable of being folded in the direction of the arrow R and a part of the exterior member 40 is provided with a hollow 40U for housing the wound electrode body 30, for example, as illustrated in FIG. 3.

This exterior member 40 is, for example, a laminated film in which a fusion layer, a metal layer, and a surface protective layer are laminated in this order. In the manufacturing process of the secondary battery, the exterior member 40 is folded so that the fusion layers face each other with the wound electrode body 30 interposed therebetween and then the peripheral edge portions of the fusion layers are fused to each other, for example, as to be described later.

The fusion layer includes, for example, any one kind or two or more kinds among films of polyethylene, polypropylene and the like. The metal layer includes, for example, any one kind or two or more kinds among an aluminum foil and the like. The surface protective layer includes, for example, any one kind or two or more kinds among films of nylon, polyethylene terephthalate and the like.

Among these, the exterior member 40 is preferably an aluminum laminated film in which a polyethylene film, an aluminum foil, and a nylon film are laminated in this order.

However, the exterior member 40 may be, for example, a laminated film having another laminated structure. Moreover, the exterior member 40 is, for example, two sheets of films, and the two sheets of films may be pasted to each other with an adhesive interposed therebetween, for example. In addition to this, the exterior member 40 may be, for example, a single-layer polymer film of polypropylene and the like or a single-layer metal foil of aluminum and the like.

The wound electrode body 30 is formed as a positive electrode 33 and a negative electrode 34 are stacked with a separator 35 and an electrolyte layer 36 interposed therebetween and then the positive electrode 33, the negative electrode 34, the separator 35, and the electrolyte layer 36 are wound, for example, as illustrated in FIG. 4. The outermost peripheral portion of the wound electrode body 30 is protected by a protective tape 37, for example.

A positive electrode lead 31 is connected to the positive electrode 33, and the positive electrode lead 31 is led out from the inside to the outside of the exterior member 40. This positive electrode lead 31 contains any one kind or two or more kinds among, for example, conductive materials such as aluminum. The shape of the positive electrode lead 31 is, for example, a thin plate shape or a mesh shape.

A negative electrode lead 32 is connected to the negative electrode 34, and the negative electrode lead 32 is led out from the inside to the outside of the exterior member 40. The lead-out direction of the negative electrode lead 32 is, for example, the same as the lead-out direction of the positive electrode lead 31. This negative electrode lead 32 contains any one kind or two or more kinds among, for example, conductive materials such as copper, nickel, and stainless steel. The shape of the negative electrode lead 32 is, for example, the same as the shape of the positive electrode lead 31.

For example, a close contact film 41 is inserted between the exterior member 40 and the positive electrode lead 31 in order to prevent intrusion of outside air. This close contact film 41 contains any one kind or two or more kinds among, for example, materials exhibiting close contact property with respect to the positive electrode lead 31 and more specifically contains a polyolefin resin and the like. This polyolefin resin is any one kind or two or more kinds among, for example, polyethylene, polypropylene, modified polyethylene, and modified polypropylene.

For example, a close contact film 42 having a function the same as that of the close contact film 41 is inserted between the exterior member 40 and the negative electrode lead 32. The material for forming the close contact film 42 is, for example, the same as the material for forming the close contact film 41.

The positive electrode 33 includes, for example, a positive electrode current collector 33A and a positive electrode active material layer 33B as well as the negative electrode 34 includes, for example, a negative electrode current collector 34A and a negative electrode active material layer 34B. The configurations of the positive electrode current collector 33A, positive electrode active material layer 33B, negative electrode current collector 34A, and negative electrode active material layer 34B are, for example, similar to the configurations of the positive electrode current collector 21A, the positive electrode active material layer 21B, negative electrode current collector 22A, and negative electrode active material layer 22B. In addition, the configuration of the separator 35 is, for example, similar to the configuration of the separator 23.

In other words, the negative electrode 34 contains a plurality of primary negative electrode active material particles and a plurality of secondary negative electrode active material particles (lithium titanium composite oxide) as a negative electrode active material as well as contains a plurality of flaky carbon materials as a negative electrode conductive agent. Moreover, the conditions described above are satisfied with regard to each of the configuration (particle size proportion and median diameter D50) of the negative electrode active material and the configuration (average aspect ratio and weight proportion) of the negative electrode conductive agent.

The electrolyte layer 36 contains an electrolytic solution and a polymer compound. The composition of the electrolytic solution is, for example, similar to the composition of the electrolytic solution to be used in the cylindrical type secondary battery. However, the electrolyte layer 36 may further contain any one kind or two or more kinds among other materials such as additives.

The electrolyte layer 36 to be described here is a so-called gel-like electrolyte, and the electrolytic solution is retained by the polymer compound in the electrolyte layer 36. This is because high ionic conductivity (for example, 1 mS/cm or more at room temperature) is attained as well as leakage of the electrolytic solution is prevented.

The polymer compound contains any one kind or two or more kinds among homopolymers, copolymers and the like. Examples of the homopolymers include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Examples of the copolymers include a copolymer of vinylidene fluoride and hexafluoropyrene. Among these, the homopolymer is preferably polyvinylidene fluoride as well as the copolymer is preferably a copolymer of vinylidene fluoride and hexafluoropyrene. This is because these are electrochemically stable.

In the electrolyte layer 36 which is a gel-like electrolyte, the "solvent" contained in the electrolytic solution is a broad concept including not only a liquid material but also a material exhibiting ion conductivity capable of dissociating an electrolyte salt. For this reason, in the case of using a polymer compound exhibiting ion conductivity, the polymer compound is also included in the solvent.

Incidentally, an electrolytic solution may be used instead of the electrolyte layer 36. In this case, the wound electrode body 30 (the positive electrode 33, the negative electrode 34, and the separator 35) is impregnated with the electrolytic solution.

This secondary battery operates, for example, as follows.

At the time of charging, lithium ions are released from the positive electrode 33 as well as the lithium ions are stored in the negative electrode 34 via the electrolyte layer 36. On the other hand, at the time of discharging, lithium ions are released from the negative electrode 34 as well as the lithium ions are stored in the positive electrode 33 via the electrolyte layer 36.

The secondary battery including the gel-like electrolyte layer 36 is manufactured, for example, according to the following three kinds of procedures.

First, the positive electrode 33 is fabricated according to a procedure similar to the procedure for fabricating the positive electrode 21 as well as the negative electrode 34 is fabricated according to a procedure similar to the procedure for fabricating the negative electrode 22. Specifically, the positive electrode active material layer 33B is formed on both surfaces of the positive electrode current collector 33A in the case of fabricating the positive electrode 33 as well as the negative electrode active material layer 34B is formed on both surfaces of the negative electrode current collector 34A in the case of fabricating the negative electrode 34.

Subsequently, a precursor solution is prepared by mixing an electrolytic solution, a polymer compound, an organic solvent and the like together and then stirring the mixture. Subsequently, the precursor solution is applied to the positive electrode 33 and then dried to form the gel-like electrolyte layer 36. In addition, the precursor solution is applied to the negative electrode 34 and then dried to form the gel-like electrolyte layer 36.

Subsequently, the positive electrode lead 31 is connected to the positive electrode current collector 33A by a welding method and the like as well as the negative electrode lead 32 is connected to the negative electrode current collector 34A by a welding method and the like. Subsequently, the positive electrode 33 and the negative electrode 34 are wound with the separator 35 and the electrolyte layer 36 interposed therebetween and then the positive electrode 33, the negative electrode 34, the separator 35, and the electrolyte layer 36 are wound to form the wound electrode body 30. Thereafter, the protective tape 37 is pasted to the outermost peripheral portion of the wound electrode body 30.

Finally, the exterior member 40 is folded so as to sandwich the wound electrode body 30 therebetween and then the peripheral edge portions of the exterior member 40 are fused to each other by a heat seal method and the like to encapsulate the wound electrode body 30 inside the exterior member 40. In this case, the close contact film 41 is inserted between the positive electrode lead 31 and the exterior member 40 as well as the close contact film 42 is inserted between the negative electrode lead 32 and the exterior member 40.

First, each of the positive electrode 33 and the negative electrode 34 is fabricated according to a procedure similar to the first procedure described above, and then the positive electrode lead 31 is connected to the positive electrode 33 by a welding method and the like as well as the negative electrode lead 32 is connected to the negative electrode 34 by a welding method and the like. Subsequently, the positive electrode 33 and the negative electrode 34 are stacked with the separator 35 interposed therebetween, and then the positive electrode 33, the negative electrode 34, and the separator 35 are wound to fabricate a wound body which is a precursor of the wound electrode body 30. Thereafter, the protective tape 37 is pasted to the outermost peripheral portion of the wound body.

Subsequently, the exterior member 40 is folded so as to sandwich the wound electrode body 30 therebetween and then the remaining peripheral edge portions of the exterior member 40 excluding the peripheral edge portion on one side are fused to each other by a heat seal method and the like to house the wound body inside the bag-shaped exterior member 40.

Subsequently, an electrolyte composition is prepared by mixing an electrolytic solution, a monomer which is a raw material of a polymer compound, a polymerization initiator, and, if necessary, other materials such as a polymerization inhibitor together and then stirring the mixture. Subsequently, the electrolyte composition is injected into the bag-shaped exterior member 40, and then the exterior member 40 is sealed by a heat seal method and the like.

Finally, a polymer compound is formed by thermally polymerizing the monomer in the electrolyte composition. By this, the electrolytic solution is retained by the polymer compound, and the gel-like electrolyte layer 36 is thus formed.

First, a wound body is fabricated according to a procedure similar to the second procedure described above except that the separator 35 is used in which two polymer compound layers are formed on both surfaces of a porous membrane (base material layer). Subsequently, the wound body is housed inside the bag-shaped exterior member 40. Subsequently, the electrolytic solution is injected into the exterior member 40, and then the opening portion of the exterior member 40 is sealed by a heat seal method and the like. Subsequently, the separator 35 is brought into close contact with the positive electrode 33 with the polymer compound layer interposed therebetween as well as the separator 35 is brought into close contact with the negative electrode 34 with the polymer compound layer interposed therebetween by heating the exterior member 40 while applying a load to the exterior member 40. By this, the polymer compound layers are impregnated with the electrolytic solution as well as gelate, and the electrolyte layer 36 is thus formed.

In this third procedure, the secondary battery is less likely to swell as compared to that in the first procedure. Moreover, the solvent and the monomer (raw material of polymer compound) and the like are less likely to remain in the electrolyte layer 36 in the third procedure as compared to the second procedure, and thus the step of forming a polymer compound is favorably controlled. By this, each of the positive electrode 33, the negative electrode 34, and the separator 35 is brought into sufficiently close contact with the electrolyte layer 36.

According to this laminated film type secondary battery, the negative electrode 34 has a configuration similar to that of the negative electrode 22, and thus excellent battery characteristics can be attained for the same reasons as those in the cylindrical type secondary battery.

The operations and effects other than these of the laminated film type secondary battery are similar to the operations and effects of the cylindrical type lithium ion secondary battery.

Next, application examples of the above-described secondary batteries will be described.

The applications of the secondary batteries are not particularly limited as long as these are machines, devices, instruments, apparatuses, and systems (an assembly of a plurality of devices) which can utilize the secondary batteries as a power source for driving or an electric power storage source for storing electric power. The secondary battery to be used as a power source may be a main power source or an auxiliary power source. The main power source is a power source to be preferentially used regardless of the presence or absence of other power sources. The auxiliary power source may be, for example, a power source to be used instead of the main power source or a power source which can be switched from the main power source, if necessary. In the case of using the secondary batteries as an auxiliary power source, the kind of main power source is not limited to secondary batteries.

The applications of the secondary batteries are, for example, as follows. Electronic devices (including portable electronic devices) such as video cameras, digital still cameras, mobile phones, notebook computers, cordless phones, headphone stereos, portable radios, portable televisions, and portable information terminals. Portable daily appliances such as electric shavers. Memory apparatuses such as backup power sources and memory cards. Electric tools such as electric drills and electric saws. Battery packs to be mounted on notebook computers and the like as a detachable power source. Medical electronic devices such as pacemakers and hearing aids. Electrically driven vehicles such as electric vehicles (including hybrid vehicles). Electric power storage systems such as household battery systems which store electric power in case of an emergency. Of course, the applications of the secondary batteries may be applications other than those mentioned above.

Among these, it is effective that the secondary batteries are applied to a battery pack, an electrically driven vehicle, an electric power storage system, an electric tool, an electronic device, and the like. This is because excellent battery characteristics are required for these applications and thus the performance can be effectively improved by use of the secondary batteries of the present technology. Incidentally, a battery pack is a power source including a secondary battery. A single battery or an assembled battery may be used in this battery pack as to be described later. An electrically driven vehicle is a vehicle which operates (travels) using a secondary battery as a power source for driving and may be a motor vehicle (a hybrid vehicle or the like) provided with a driving source in addition to a secondary battery as described above. The electric power storage system is a system which uses a secondary battery as a power storage source. For example, in a household electric power storage system, electric power is accumulated in a secondary battery which is an electric power storage source and household electric appliances and the like can be thus used by utilizing the electric power. An electric tool is a tool in which a moving unit (for example, a drill) moves using a secondary battery as a power source for driving. An electronic device is a device which performs various functions using a secondary battery as a power source for driving (power supply source).

Here, several application examples of the secondary batteries will be specifically described. Incidentally, the configurations of the application examples to be described below are an example to the utmost and thus the configurations of the application examples can be appropriately changed.

Figure 5:
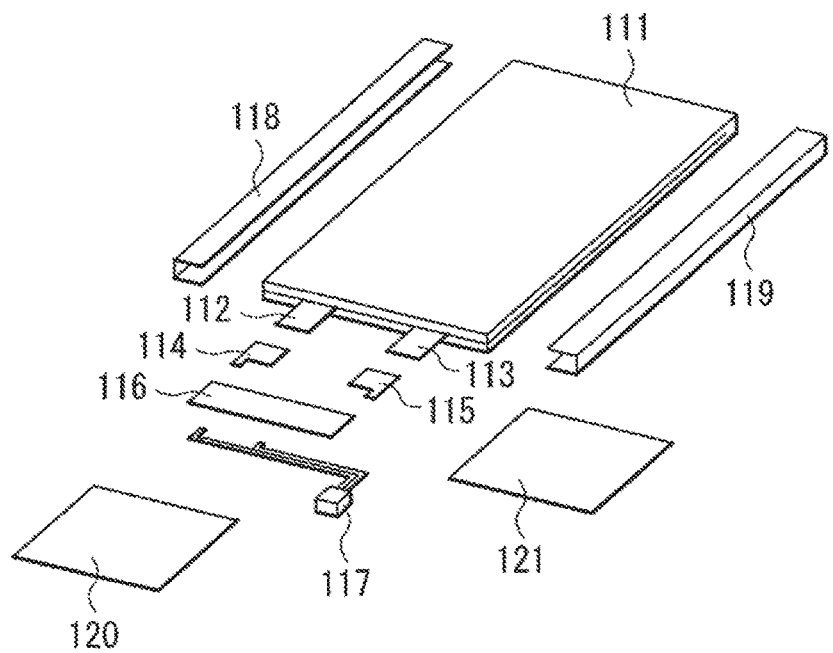
FIG. 5 is a perspective diagram illustrating the configuration of an application example (battery pack: single battery) of a secondary battery according to an embodiment of the present technology.
Figure 6:
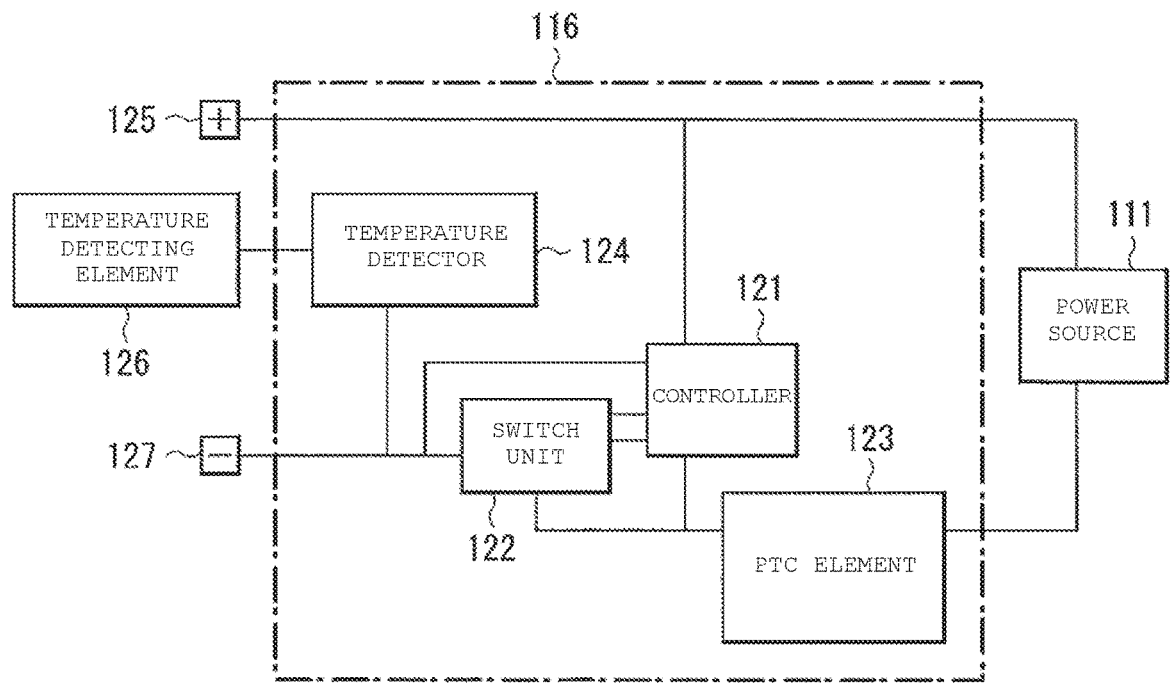
FIG. 6 is a block diagram illustrating the configuration of the battery pack illustrated in FIG. 5.

FIG. 5 illustrates a perspective configuration of a battery pack including a single battery. FIG. 6 illustrates a block configuration of the battery pack illustrated in FIG. 5. Incidentally, a state in which the battery pack is disassembled is illustrated in FIG. 5.

The battery pack to be described here is a simple battery pack (so-called soft pack) including one secondary battery and is mounted on, for example, an electronic device typified by a smartphone. This battery pack includes a power source 111 which is a laminated film type secondary battery, and a circuit board 116 to be connected to the power source 111, for example, as illustrated in FIG. 5. A positive electrode lead 112 and a negative electrode lead 113 are attached to this power source 111.

A pair of adhesive tapes 118 and 119 are pasted to both side surfaces of the power source 111. A protection circuit module (PCM) is formed on the circuit board 116. This circuit board 116 is connected to the positive electrode 112 via a tab 114 as well as connected to the negative electrode lead 113 via a tab 115. In addition, the circuit board 116 is connected to a lead wire 117 with a connector for external connection. Incidentally, in a state in which the circuit board 116 is connected to the power source 111, the circuit board 116 is protected by a label 120 and an insulating sheet 121. As this label 120 is pasted, the circuit board 116, the insulating sheet 121 and the like are fixed.

Moreover, the battery pack includes the power source 111 and the circuit board 116, for example, as illustrated in FIG. 6. The circuit board 116 includes, for example, a controller 121, a switch unit 122, a PTC element 123, and a temperature detector 124. The power source 111 can be connected to the outside via a positive terminal 125 and a negative terminal 127 and thus is charged and discharged through the positive terminal 125 and the negative terminal 127. The temperature detector 124 detects the temperature using a temperature detecting terminal (so-called T terminal) 126.

The controller 121 controls the operation (including the usage state of the power source 111) of the entire battery pack. This controller 121 includes, for example, a central processing unit (CPU) and a memory.

This controller 121 cuts off the switch unit 122 so that the charging current does not flow in the current path of the power source 111, for example, when the battery voltage reaches the overcharge detection voltage. In addition, the controller 121 blocks the charging current by cutting off the switch unit 122, for example, when a large current flows at the time of charging.

On the other hand, the controller 121 cuts off the switch unit 122 so that the discharging current does not flow in the current path of the power source 111, for example, when the battery voltage reaches the overdischarge detection voltage. In addition, the controller 121 blocks the discharging current by cutting off the switch unit 122, for example, when a large current flows at the time of discharging.

Incidentally, the overcharge detection voltage is not particularly limited and is, for example, 4.2 V±0.05 V as well as the overdischarge detection voltage is not particularly limited and is, for example, 2.4 V±0.1 V.

The switch unit 122 switches the usage state of the power source 111, namely, the connection state of the power source 111 to an external device in accordance with the instruction from the controller 121. This switch unit 122 includes, for example, a charging control switch and a discharging control switch. Each of the charging control switch and the discharging control switch is, for example, a semiconductor switch such as a metal oxide semiconductor field effect transistor (MOSFET). Incidentally, the charging and discharging current is detected based on, for example, the ON resistance of the switch unit 122.

The temperature detector 124 measures the temperature of the power source 111 as well as outputs the measurement result of temperature to the controller 121. This temperature detector 124 includes, for example, a temperature detecting element such as a thermistor. Incidentally, the measurement result of temperature to be measured by the temperature detector 124 is used in a case in which the controller 121 performs charging and discharging control at the time of abnormal heat generation, a case in which the controller 121 performs correction processing when calculating the remaining capacity, and the like.

Incidentally, the circuit board 116 may not include the PTC element 123. In this case, a PTC element may be separately installed in the circuit board 116.

Figure 7:
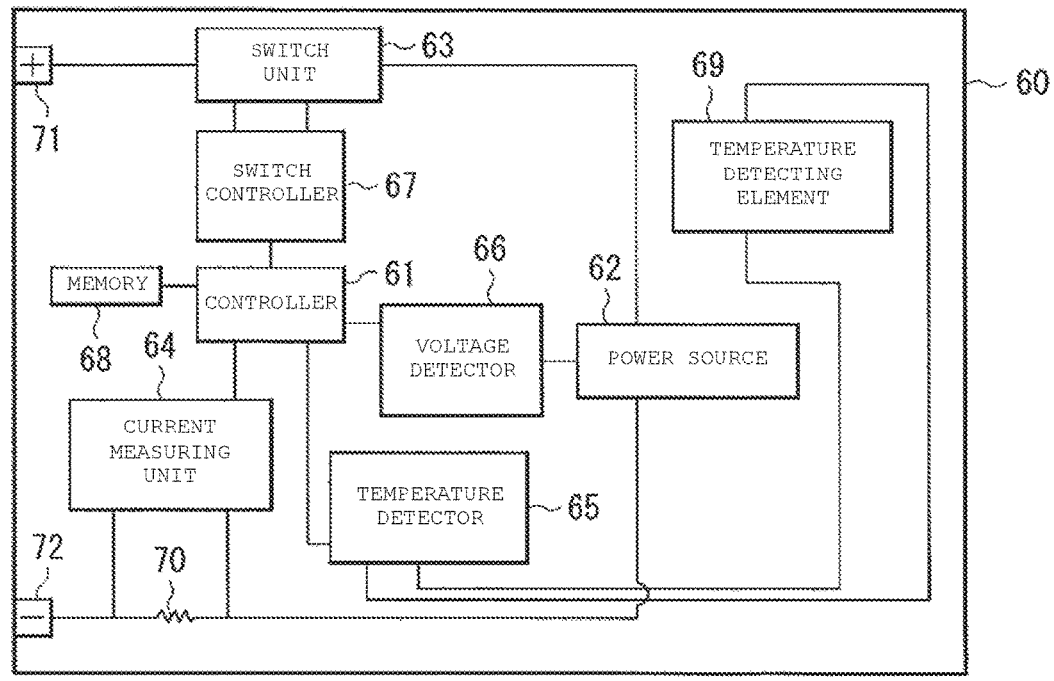
FIG. 7 is a block diagram illustrating the configuration of an application example (battery pack: assembled battery) of a secondary battery according to an embodiment of the present technology.

FIG. 7 illustrates a block configuration of a battery pack including an assembled battery.

This battery pack includes, for example, a controller 61, a power source 62, a switch unit 63, a current measuring unit 64, a temperature detector 65, a voltage detector 66, a switch controller 67, a memory 68, a temperature detecting element 69, a current detecting resistor 70, a positive terminal 71, and a negative terminal 72 inside a housing 60. This housing 60 contains, for example, a plastic material.

The controller 61 controls the operation (including the usage state of the power source 62) of the entire battery pack. This controller 61 includes, for example, a CPU. The power source 62 is an assembled battery including two or more secondary batteries, and the connection form of the two or more secondary batteries may be series connection, parallel connection, or a mixed form of these. As an example, the power source 62 includes six secondary batteries of which two are connected in parallel and three are connected in series.

The switch unit 63 switches the usage state of the power source 62, namely, the connection state of the power source 62 to an external device in accordance with the instruction from the controller 61. This switch unit 63 includes, for example, a charging control switch, a discharging control switch, a charging diode, and a discharging diode. Each of the charging control switch and the discharging control switch is, for example, a semiconductor switch such as a metal oxide semiconductor field effect transistor (MOSFET).

The current measuring unit 64 measures the current using the current detecting resistor 70 as well as outputs the measurement result of current to the controller 61. The temperature detector 65 measures the temperature using the temperature detecting element 69 as well as outputs the measurement result of temperature to the controller 61. This measurement result of temperature is used in a case in which the controller 61 performs charging and discharging control at the time of abnormal heat generation, a case in which the controller 61 performs correction processing when calculating the remaining capacity, and the like. The voltage detector 66 measures the voltage of the secondary battery in the power source 62 as well as supplies the analog-digital converted measurement result of voltage to the controller 61.

The switch controller 67 controls the operation of the switch unit 63 in accordance with the signals input from the current measuring unit 64 and the voltage detector 66, respectively.

This switch controller 67 cuts off the switch unit 63 (charging control switch) so that the charging current does not flow in the current path of the power source 62, for example, when the battery voltage reaches the overcharge detection voltage. By this, in the power source 62, only discharging is possible through the discharging diode. Incidentally, the switch controller 67 blocks the charging current, for example, when a large current flows at the time of charging.

In addition, the switch controller 67 cuts off the switch unit 63 (discharging control switch) so that the discharging current does not flow in the current path of the power source 62, for example, when the battery voltage reaches the overdischarge detection voltage. By this, in the power source 62, only charging is possible through the charging diode. Incidentally, the switch controller 67 blocks the discharging current, for example, when a large current flows at the time of discharging.

Incidentally, the overcharge detection voltage is not particularly limited and is, for example, 4.2 V+0.05 V as well as the overdischarge detection voltage is not particularly limited and is, for example, 2.4 V±0.1 V.

The memory 68 includes, for example, an EEPROM which is a nonvolatile memory. In this memory 68, for example, numerical values calculated by the controller 61, the information (for example, internal resistance in the initial state) on the secondary battery measured at the manufacturing process stage, and the like are memorized. Incidentally, the controller 61 can grasp information such as the remaining capacity when the full charging capacity of the secondary battery is memorized in the memory 68.

The temperature detecting element 69 measures the temperature of the power source 62 and outputs the measurement result of temperature to the controller 61. This temperature detecting element 69 includes, for example, a thermistor.

Each of the positive terminal 71 and the negative terminal 72 is a terminal to be connected to an external device (for example, a notebook personal computer) which works using a battery pack, an external device (for example, a charger) which is used to charge a battery pack, and the like. The power source 62 is charged and discharged through the positive terminal 71 and the negative terminal 72.

Figure 8:
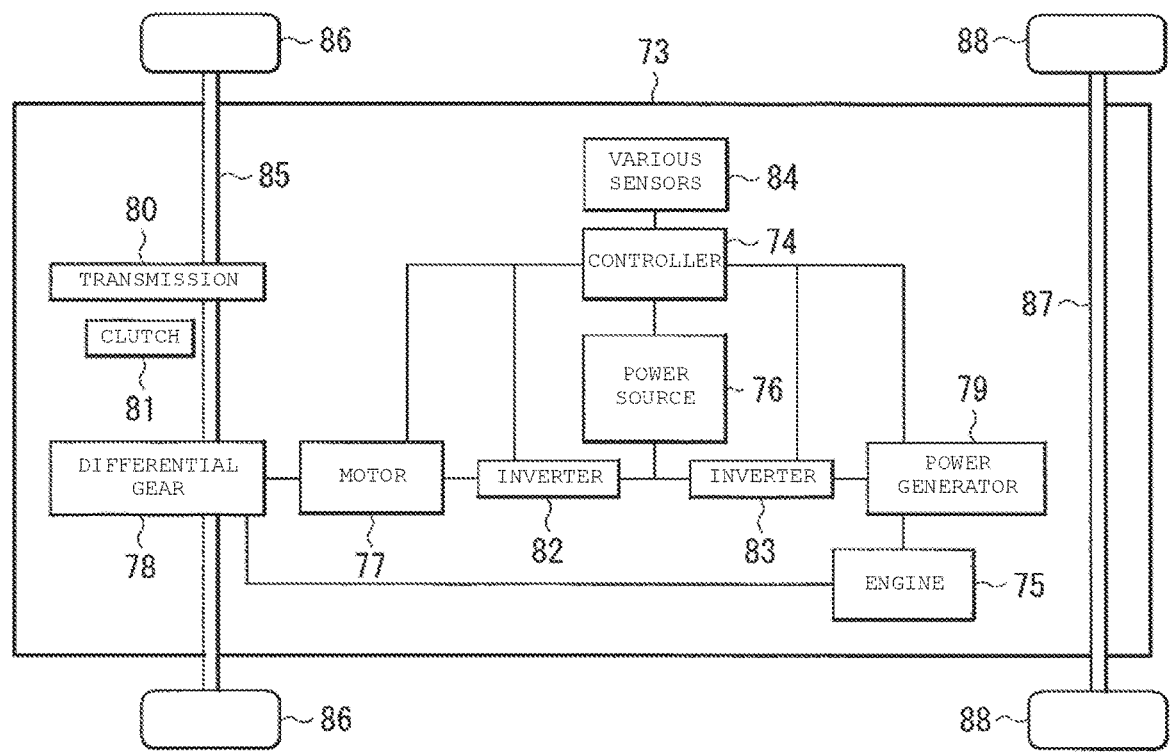
FIG. 8 is a block diagram illustrating the configuration of an application example (electrically driven vehicle) of a secondary battery according to an embodiment of the present technology.

FIG. 8 illustrates a block configuration of a hybrid vehicle which is an example of an electrically driven vehicle.

This electrically driven vehicle includes, for example, a controller 74, an engine 75, a power source 76, a driving motor 77, a differential gear 78, a power generator 79, a transmission 80 and a clutch 81, inverters 82 and 83, and various sensors 84 inside a metal housing 73. In addition to these, the electrically driven vehicle includes, for example, a front wheel drive shaft 85 connected to the differential gear 78 and the transmission 80, a front wheel 86, a rear wheel drive shaft 87, and a rear wheel 88.

This electrically driven vehicle can travel using, for example, either of the engine 75 or the motor 77 as a driving source. The engine 75 is a main power source, and examples thereof include a gasoline engine. In the case of using the engine 75 as a power source, for example, the driving force (turning force) of the engine 75 is transmitted to the front wheels 86 and the rear wheels 88 via the differential gear 78, the transmission 80, and the clutch 81 which are driving units (drivers). Incidentally, the turning force of the engine 75 is transmitted to the power generator 79, thus the power generator 79 generates alternating current power utilizing the turning force as well as the alternating current power is converted into direct current power by the inverter 83, and the direct current power is thus accumulated in the power source 76. Meanwhile, in the case of using the motor 77 which is a converter as a power source, the electric power (direct current power) supplied from the power source 76 is converted into alternating current power by the inverter 82, and thus the motor 77 is driven utilizing the alternating current power. The driving force (turning force) converted from electric power by this motor 77 is transmitted to the front wheels 86 and the rear wheels 88, for example, via the differential gear 78, the transmission 80, and the clutch 81 which are driving units.

Incidentally, when the electrically driven vehicle is decelerated by the brake mechanism, the resistance force at the time of deceleration is transmitted to the motor 77 as a turning force, and thus the motor 77 may generate alternating current power utilizing the turning force. This alternating current power is converted into direct current power by the inverter 82, and thus the direct current regenerative electric power is preferably accumulated in the power source 76.

The controller 74 controls the operation of the entire electrically driven vehicle. This controller 74 includes, for example, a CPU. The power source 76 includes one or two or more secondary batteries. This power source 76 may be connected to an external power source as well as receives electric power supply from the external power source to accumulate electric power in the power source 76. The various sensors 84 are used, for example, to control the number of revolutions of the engine 75 as well as to control the opening of the throttle valve (throttle opening). These various sensors 84 include any one kind or two or more kinds among, for example, a speed sensor, an acceleration sensor, and an engine speed sensor.

Incidentally, a case in which the electrically driven vehicle is a hybrid vehicle is taken as an example, but the electrically driven vehicle may be a vehicle (electric vehicle) which operates using only the power source 76 and the motor 77 without using the engine 75.

Figure 9:
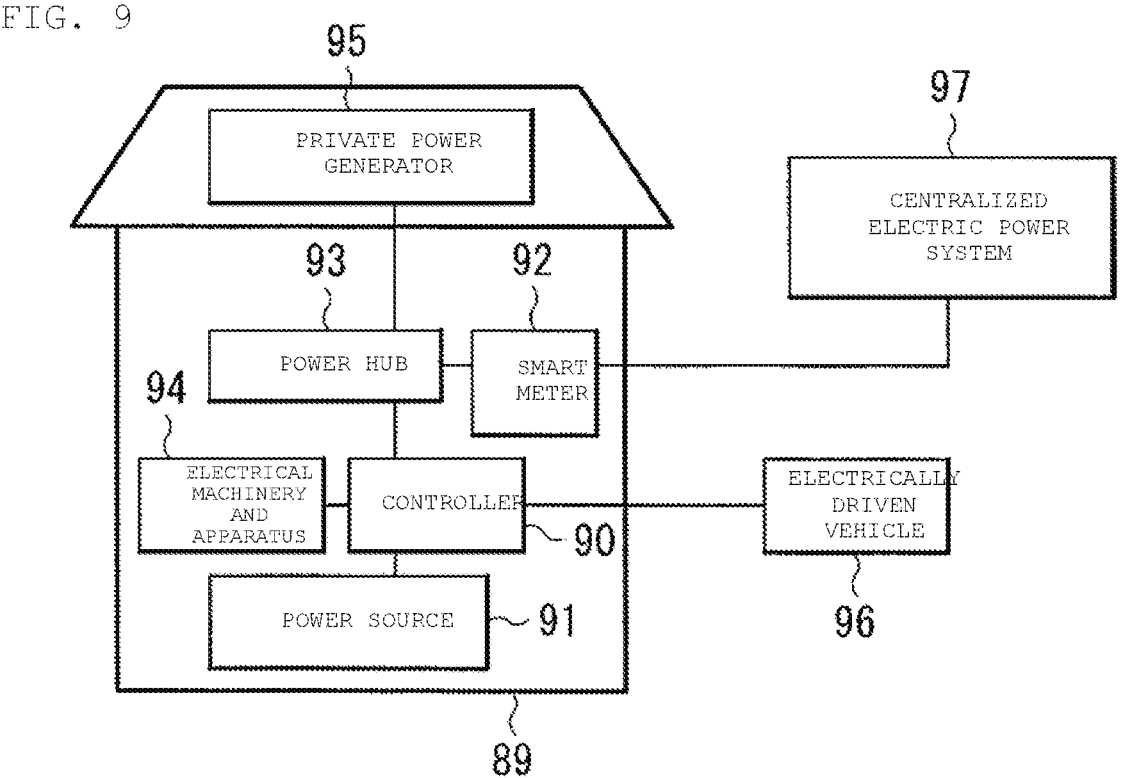
FIG. 9 is a block diagram illustrating the configuration of an application example (electric power storage system) of a secondary battery according to an embodiment of the present technology.

FIG. 9 illustrates a block configuration of an electric power storage system.

This electric power storage system includes, for example, a controller 90, a power source 91, a smart meter 92, and a power hub 93 inside a house 89 such as a general house and a commercial building.

Here, the power source 91 can be connected to, for example, an electrical machinery and apparatus 94 installed inside the house 89 as well as an electrically driven vehicle 96 stopped outside the house 89. In addition, the power source 91 can be connected to, for example, a private power generator 95 installed in the house 89 via the power hub 93 as well as an external centralized electric power system 97 via the smart meter 92 and the power hub 93.

Incidentally, the electrical machinery and apparatus 94 includes, for example, one kind or two or more kinds of household appliances, and examples of the household appliances include a refrigerator, an air conditioner, a television, and a water heater. The private power generator 95 includes any one kind or two or more kinds among, for example, a solar power generator and a wind power generator. The electrically driven vehicle 96 includes any one kind or two or more kinds among, for example, an electric vehicle, an electric motorcycle, a hybrid vehicle. The centralized electric power system 97 includes any one kind or two or more kinds among, for example, a thermal power plant, a nuclear power plant, a hydroelectric power plant, and a wind power plant.

The controller 90 controls the operation (including the usage state of the power source 91) of the entire electric power storage system. This controller 90 includes, for example, a CPU. The power source 91 includes one or two or more secondary batteries. The smart meter 92 is, for example, a network-compatible electric power meter installed in the house 89 on the electric power demand side and can communicate with the electric power supply side. Accordingly, the smart meter 92 enables highly efficient and stable energy supply, for example, by controlling the balance between the supply and demand of electric power in the house 89 while communicating with the outside.

In this electric power storage system, for example, electric power is accumulated in the power source 91 from the centralized electric power system 97 which is an external power source via the smart meter 92 and the power hub 93 as well as from the private power generator 95 which is an independent power source via the power hub 93. The electric power accumulated in this power source 91 is supplied to the electrical machinery and apparatus 94 and the electrically driven vehicle 96 in accordance with the instruction from the controller 90, and thus the electrical machinery and apparatus 94 can work as well as the electrically driven vehicle 96 can be charged. In other words, the electric power storage system is a system which makes it possible to accumulate and supply electric power in the house 89 using the power source 91.

The electric power accumulated in this power source 91 can be used if necessary.

For this reason, for example, electric power can be accumulated from the centralized electric power system 97 to the power source 91 at midnight when the electricity usage fee is low and the electric power accumulated in this power source 91 can be used during the day when the electricity usage fee is high.

Incidentally, the electric power storage system described above may be installed for each house (one household) or for a plurality of houses (multiple households).

Figure 10:
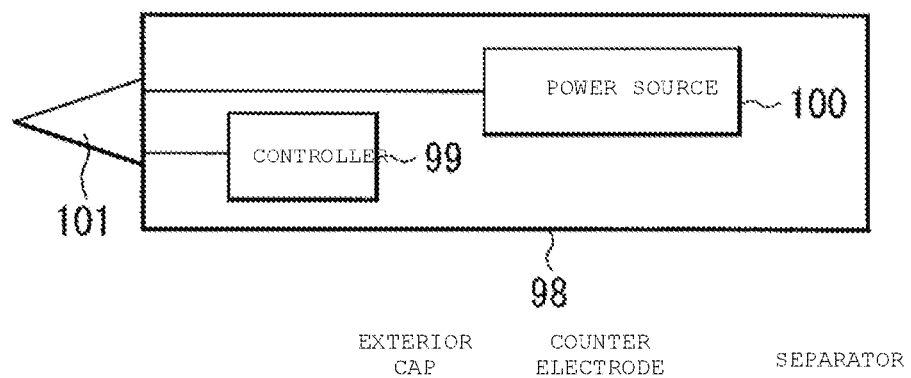
FIG. 10 is a block diagram illustrating the configuration of an application example (electric tool) of a secondary battery according to an embodiment of the present technology.
Figure 11:
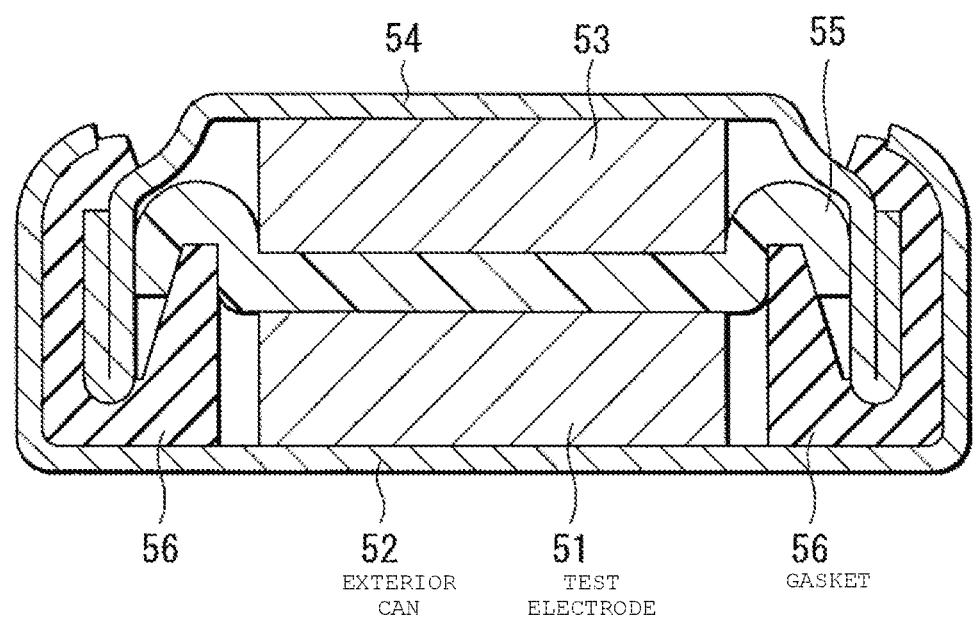
FIG. 11 is a cross-sectional diagram illustrating the configuration of a secondary battery (coin type) according to an embodiment of the present technology.

FIG. 10 illustrates a block configuration of an electric tool.

Examples of the electric tool to be described here include an electric drill. This electric tool includes, for example, a controller 99 and a power source 100 inside a tool body 98. For example, a drill unit 101 which is a moving unit is attached to this tool body 98 so as to work (rotate).

The tool body 98 contains, for example, a plastic material. The controller 99 controls the operation (including the usage state of the power source 100) of the entire electric tool. This controller 99 includes, for example, a CPU. The power source 100 includes one or two or more secondary batteries. The controller 99 supplies electric power from the power source 100 to the drill unit 101 in accordance with the operation of the operation switch.

EXAMPLES

Examples of the present technology will be described.

Experimental Examples 1-1 to 1-11

The secondary battery (lithium ion secondary battery) illustrated in FIGS. 1 and 2 was fabricated according to the procedure to be described below, and then the battery characteristics of the secondary battery were evaluated.

In the case of fabricating the positive electrode 21, a positive electrode mixture was first prepared by mixing 94 parts by mass of a positive electrode active material (lithium iron phosphate compound (LiFePO$_4$) which was a lithium-containing phosphate compound), 3 parts by mass of a positive electrode binder (polyvinylidene fluoride), and 3 parts by mass of a positive electrode conductive agent (Ketjen Black). Subsequently, the positive electrode mixture was added to an organic solvent (N-methyl-2-pyrrolidone), and then the organic solvent was stirred to prepare a paste-like positive electrode mixture slurry. Subsequently, the positive electrode mixture slurry was applied to both surfaces of the positive electrode current collector 21A (aluminum foil, thickness: 12 μm) using a coating apparatus and then dried to form the positive electrode active material layer 21B. Finally, the positive electrode active material layer 21B was compression-molded using a roll press.

In the case of fabricating the negative electrode 22, a negative electrode mixture was first prepared by mixing 93 parts by mass of a negative electrode active material containing a plurality of primary negative electrode active material particles and a plurality of secondary negative electrode active material particles (lithium titanate (Li$_4$Ti$_5$O$_{12}$) of lithium titanium composite oxide manufactured by UBE INDUSTRIES, LTD.), 5 parts by mass of a negative electrode binder (polyvinylidene fluoride), and 2 parts by mass of a negative electrode conductive agent (flaky graphite (FG) which was a plurality of flaky carbon materials). Subsequently, the negative electrode mixture was added to an organic solvent (N-methyl-2-pyrrolidone), and then the organic solvent was stirred to prepare a paste-like negative electrode mixture slurry.

After the preparation of the negative electrode mixture slurry, the median diameter D50 (μm) of the plurality of primary negative electrode active material particles, the median diameter D50 (μm) of the plurality of secondary negative electrode active material particles, the particle size proportion (%), the average aspect ratio (AR) of the plurality of flaky carbon materials, and the weight proportion (wt %) are as presented in Table 1. In order to change the particle size proportion, the time required for preparation of the negative electrode mixture was changed as described above.

Incidentally, as a negative electrode conductive agent, granular carbon materials (Ketjen black (KB), acetylene black (AB)) and fibrous carbon materials (vapor-grown carbon fibers (VGCF)) were also used instead of flaky carbon materials for comparison.

Subsequently, the negative electrode mixture slurry was applied to both surfaces of the negative electrode current collector 22A (aluminum foil, thickness: 12 μm) using a coating apparatus and then dried to form the negative electrode active material layer 22B. Finally, the negative electrode active material layer 22B was compression-molded using a roll press.

In the case of preparing an electrolytic solution, another solvent (unsaturated cyclic carbonate ester) was added to a solvent (cyclic carbonate ester and chain carbonate ester) and then an electrolyte salt (lithium hexafluorophosphate) was added to the solvents to dissolve the electrolyte salt. In this case, propylene carbonate was used as a cyclic carbonate ester, dimethyl carbonate and ethyl methyl carbonate were used as a chain carbonate ester, and vinylene carbonate was used as an unsaturated cyclic carbonate ester. The mixing ratio (weight ratio) of the solvents was set to propylene carbonate:dimethyl carbonate:ethyl methyl carbonate=40:30:30 as well as the content of another solvent (unsaturated cyclic carbonate ester) was set to 1% by weight. The content of electrolyte salt was set to 1.3 mol/kg with respect to the solvents and another solvent.

In the case of assembling a secondary battery, first, the aluminum positive electrode lead 25 was welded to the positive electrode current collector 21A as well as the nickel negative electrode lead 26 was welded to the negative electrode current collector 22A. Subsequently, the positive electrode 21 and the negative electrode 22 were stacked with the separator 23 (porous polyethylene film, thickness=16 μm) interposed therebetween. Subsequently, the positive electrode 21 and the negative electrode 22 stacked with the separator 23 interposed therebetween were wound, and then an adhesive tape was pasted to the winding end part to fabricate a wound body. Subsequently, the center pin 24 was inserted into the winding center 20C of the wound body. Subsequently, the wound body was housed inside the nickel-plated iron battery can 11 while being sandwiched between the pair of insulating plates 12 and 13. In this case, one end portion of the positive electrode lead 25 was welded to the safety valve mechanism 15 and one end portion of the negative electrode lead 26 was welded to the battery can 11. Subsequently, the electrolytic solution was injected into the battery can 11 by a decompression method. By this, each of the positive electrode 21, the negative electrode 22, and the separator 23 was impregnated with the electrolytic solution, and the wound electrode body 20 was thus formed. Finally, the battery lid 14, the safety valve mechanism 15, and the heat sensitive resistance element 16 were crimped to the opening end portion of the battery can 11 with the gasket 17 interposed therebetween. By this, the wound electrode body 20 was housed inside the battery can 11, and a cylindrical type secondary battery was thus completed.

As the battery characteristics of the secondary battery, peeling durability characteristics, electric resistance characteristics, and load characteristics were evaluated, and the results presented in Table 1 were attained.

In the case of evaluating the peeling durability characteristics, the negative electrode 22 was fabricated in the secondary battery fabrication process, and then a peeling test was performed using this negative electrode 22 to examine the peel strength (mN/mm).

Specifically, the peel strength of the negative electrode active material layer 22B was measured by peeling off the negative electrode active material layer 22B from the negative electrode current collector 22A using a peel tester. In this case, the formation conditions of the negative electrode active material layer 22B were set to area density=9.3 mg/cm² to 9.5 mg/cm², and the peel strength measurement conditions were set to peeling rate=100 mm/min.

In the case of evaluating the electric resistance characteristics, the secondary battery was charged by constant current charging at a current of 0.1 C until the charging depth reached 50% and then discharged. At the time of discharging, the secondary battery was discharged at a current of 1 C for 10 seconds, rested for 60 seconds, discharged at a current of 3 C for 10 seconds, and rested for 60 seconds. 0.1 C is a current value at which the battery capacity (theoretical capacity) can be discharged in 10 hours, 1 C is a current value at which the battery capacity can be discharged in 1 hour, and 3 C is a current value at which the battery capacity can be discharged in ⅓ hour. In this case, discharging was performed at a current of 1 C for 10 seconds and then the current I1 and the open circuit voltage V1 were measured as well as discharging was performed at a current of 3 C for 10 seconds and then the current I2 and the open circuit voltage V2 were measured. As a result, direct current resistance (mΩ)=(V2−V1)/(I2−I1) was calculated.

In the case of examining the load characteristics, the load potential (V) was measured by performing a load test using the secondary battery.

Specifically, in order to stabilize the battery state, the secondary battery was charged and discharged one cycle in a normal temperature environment (23° C.). At the time of charging, constant current charging was performed at a current of 10 C until the voltage reached 2.5 V, and then constant voltage charging was performed at a voltage of 2.5 V until the current reached 0.01 C. At the time of discharging, discharging was performed at a current of 1 C until the voltage reached 0.5 V. 10 C is a current value at which the battery capacity can be discharged in 0.1 hour, 0.01 C is a current value at which the battery capacity can be discharged in 100 hours, and 0.5 C is a current value at which the battery capacity can be discharged in 2 hours.

Thereafter, the load potential of the secondary battery was measured by charging the secondary battery by constant current charging at a current of 10 C until the charging depth reached 50%.

TABLE 1

Positive electrode active material: $LiFePO_4$

| | Negative electrode active material | | | | Negative electrode conductive agent | | | Direct | |
|---|---|---|---|---|---|---|---|---|---|
| | Primary negative electrode active material particles | | Secondary negative electrode active material particles | | Particle | | | | |
| Experimental Example | Kind | D50 (μm) | Kind | D50 (μm) | proportion (%) | Kind | Average AR | Weight proportion (% by weight) | Peel strength (mN/mm) | current resistance (mΩ) | Load potential (V) |
|---|---|---|---|---|---|---|---|---|---|---|---|
| 1-1 | — | — | $Li_4Ti_5O_{12}$ | 10 | 0 | FG | 7 | 2 | 4 | 20.0 | 2.26 |
| 1-2 | $Li_4Ti_5O_{12}$ | 0.5 | $Li_4Ti_5O_{12}$ | 10 | 10 | FG | 7 | 2 | 4 | 19.8 | 2.25 |
| 1-3 | $Li_4Ti_5O_{12}$ | 0.5 | $Li_4Ti_5O_{12}$ | 10 | 30 | FG | 7 | 2 | 6 | 19.5 | 2.25 |
| 1-4 | $Li_4Ti_5O_{12}$ | 0.5 | $Li_4Ti_5O_{12}$ | 10 | 50 | FG | 7 | 2 | 7 | 19.5 | 2.24 |
| 1-5 | $Li_4Ti_5O_{12}$ | 0.5 | $Li_4Ti_5O_{12}$ | 10 | 75 | FG | 7 | 2 | 8 | 19.3 | 2.24 |
| 1-6 | $Li_4Ti_5O_{12}$ | 0.5 | $Li_4Ti_5O_{12}$ | 10 | 95 | FG | 7 | 2 | 10 | 19.2 | 2.23 |
| 1-7 | $Li_4Ti_5O_{12}$ | 0.5 | $Li_4Ti_5O_{12}$ | 10 | 99 | FG | 7 | 2 | 10 | 19.0 | 2.22 |
| 1-8 | $Li_4Ti_5O_{12}$ | 0.5 | — | — | 100 | FG | 7 | 2 | 11 | 18.9 | 2.20 |
| 1-9 | $Li_4Ti_5O_{12}$ | 0.5 | $Li_4Ti_5O_{12}$ | 10 | 95 | KB | — | 2 | 8 | 19.3 | 2.23 |
| 1-10 | $Li_4Ti_5O_{12}$ | 0.5 | $Li_4Ti_5O_{12}$ | 10 | 95 | AB | — | 2 | 8 | 19.8 | 2.25 |
| 1-11 | $Li_4Ti_5O_{12}$ | 0.5 | $Li_4Ti_5O_{12}$ | 10 | 95 | VGCF | — | 2 | 9 | 19.2 | 2.24 |

As presented in Table 1, each of the peel strength, direct current resistance, and load potential greatly varied depending on the particle size proportion. In this case, when the particle size proportion was 95% or more (Experimental Examples 1-6 to 1-8), the peel strength increased as well as each of the direct current resistance and the load potential decreased as compared to a case in which the particle size proportion is out of the above range (Experimental Examples 1-1 to 1-5).

Incidentally, even when the particle size proportion is 95% or more, in a case in which a granular carbon material and a fibrous carbon material were used as a negative electrode conductive agent (Experimental Examples 1-9 to 1-11), the peel strength decreased as well as each of the direct current resistance and the load potential increased to be equal or higher as compared to a case in which a flaky carbon material was used as a negative electrode conductive agent (Experimental Example 1-6).

Experimental Examples 2-1 to 2-6

As presented in Table 2, secondary batteries were fabricated as well as the battery characteristics thereof were evaluated according to the same procedure except that the median diameter D50 of the plurality of primary negative electrode active material particles was changed. In order to change the median diameter D50 of the plurality of primary negative electrode active material particles, plural kinds of primary negative electrode active material particles having different median diameters D50 were used.

As presented in Table 3, in a case in which the average aspect ratio of the negative electrode conductive agent was 6 to 8.5 (Experimental Examples 1-6 and 3-2 to 3-6), great

TABLE 2

Positive electrode active material: $LiFePO_4$

| Experimental Example | Negative electrode active material | | | | Particle size proportion (%) | Negative electrode conductive agent | | Peel strength (mN/mm) | Direct current resistance (mΩ) | Load potential (V) |
|---|---|---|---|---|---|---|---|---|---|---|
| | Primary negative electrode active material particles | | Secondary negative electrode active material particles | | | | | | | |
| | Kind | D50 (μm) | Kind | D50 (μm) | | Kind | Average AR | Weight proportion (% by weight) | | | |
| 2-1 | $Li_4Ti_5O_{12}$ | 0.05 | $Li_4Ti_5O_{12}$ | 10 | 95 | FG | 7 | 2 | 4 | 19.6 | 2.25 |
| 2-2 | $Li_4Ti_5O_{12}$ | 0.1 | $Li_4Ti_5O_{12}$ | 10 | 95 | FG | 7 | 2 | 6 | 19.3 | 2.23 |
| 2-3 | $Li_4Ti_5O_{12}$ | 0.3 | $Li_4Ti_5O_{12}$ | 10 | 95 | FG | 7 | 2 | 7 | 19.3 | 2.22 |
| 1-6 | $Li_4Ti_5O_{12}$ | 0.5 | $Li_4Ti_5O_{12}$ | 10 | 95 | FG | 7 | 2 | 10 | 19.2 | 2.23 |
| 2-4 | $Li_4Ti_5O_{12}$ | 0.7 | $Li_4Ti_5O_{12}$ | 10 | 95 | FG | 7 | 2 | 11 | 19.2 | 2.23 |
| 2-5 | $Li_4Ti_5O_{12}$ | 1 | $Li_4Ti_5O_{12}$ | 10 | 95 | FG | 7 | 2 | 11 | 19.3 | 2.22 |
| 2-6 | $Li_4Ti_5O_{12}$ | 2 | $Li_4Ti_5O_{12}$ | 10 | 95 | FG | 7 | 2 | 12 | 19.3 | 2.25 |

As presented in Table 2, in a case in which the median diameter D50 of the plurality of primary negative electrode active material particles was 0.1 μm to 1 μm (Experimental Examples 1-6 and 2-2 to 2-5), great peel strength was attained while the direct current resistance and load potential were each kept low as compared to a case in which the median diameter D50 was out of the above range (Experimental Examples 2-1 and 2-6).

Experimental Examples 3-1 to 3-7

As presented in Table 3, secondary batteries were fabricated as well as the battery characteristics thereof were evaluated according to the same procedure except that the average aspect ratio of the negative electrode conductive agent (a plurality of flaky carbon materials) was changed. In order to change the average aspect ratio of the negative electrode conductive agent, plural kinds of flaky carbon materials having different average aspect ratios were used.

peel strength was attained while the direct current resistance and load potential were each kept low as compared to a case in which the average aspect ratio was out of the above range (Experimental Examples 3-1 and 3-7).

Experimental Examples 4-1 to 4-7

As presented in Table 4, secondary batteries were fabricated as well as the battery characteristics thereof were evaluated according to the same procedure except that the weight proportion of the negative electrode conductive agent was changed. In order to change the weight proportion of the negative electrode conductive agent, the mixing ratio of the negative electrode conductive agent was adjusted.

TABLE 3

Positive electrode active material: $LiFePO_4$

| Experimental Example | Negative electrode active material | | | | Particle size proportion (%) | Negative electrode conductive agent | | Peel strength (mN/mm) | Direct current resistance (mΩ) | Load potential (V) |
|---|---|---|---|---|---|---|---|---|---|---|
| | Primary negative electrode active material particles | | Secondary negative electrode active material particles | | | | | | | |
| | Kind | D50 (μm) | Kind | D50 (μm) | | Kind | Average AR | Weight proportion (% by weight) | | | |
| 3-1 | $Li_4Ti_5O_{12}$ | 0.5 | $Li_4Ti_5O_{12}$ | 10 | 95 | FG | 4 | 2 | 12 | 20.0 | 2.28 |
| 3-2 | $Li_4Ti_5O_{12}$ | 0.5 | $Li_4Ti_5O_{12}$ | 10 | 95 | FG | 6 | 2 | 10 | 19.5 | 2.26 |
| 3-3 | $Li_4Ti_5O_{12}$ | 0.5 | $Li_4Ti_5O_{12}$ | 10 | 95 | FG | 6.5 | 2 | 9 | 19.4 | 2.25 |
| 1-6 | $Li_4Ti_5O_{12}$ | 0.5 | $Li_4Ti_5O_{12}$ | 10 | 95 | FG | 7 | 2 | 10 | 19.2 | 2.23 |
| 3-4 | $Li_4Ti_5O_{12}$ | 0.5 | $Li_4Ti_5O_{12}$ | 10 | 95 | FG | 7.5 | 2 | 9 | 19.1 | 2.22 |
| 3-5 | $Li_4Ti_5O_{12}$ | 0.5 | $Li_4Ti_5O_{12}$ | 10 | 95 | FG | 8 | 2 | 8 | 19.2 | 2.23 |
| 3-6 | $Li_4Ti_5O_{12}$ | 0.5 | $Li_4Ti_5O_{12}$ | 10 | 95 | FG | 8.5 | 2 | 7 | 19.1 | 2.23 |
| 3-7 | $Li_4Ti_5O_{12}$ | 0.5 | $Li_4Ti_5O_{12}$ | 10 | 95 | FG | 10 | 2 | 5 | 19.1 | 2.23 |

TABLE 4

Positive electrode active material: LiFePO$_4$

| Experimental Example | Negative electrode active material | | | | Particle size proportion (%) | Negative electrode conductive agent | | | Peel strength (mN/mm) | Direct current resistance (mΩ) | Load potential (V) |
|---|---|---|---|---|---|---|---|---|---|---|---|
| | Primary negative electrode active material particles | | Secondary negative electrode active material particles | | | | | | | | |
| | Kind | D50 (μm) | Kind | D50 (μm) | | Kind | Average AR | Weight proportion (% by weight) | | | |
| 4-1 | Li$_4$Ti$_5$O$_{12}$ | 0.5 | Li$_4$Ti$_5$O$_{12}$ | 10 | 95 | — | — | 0 | 12 | 19.6 | 2.28 |
| 4-2 | Li$_4$Ti$_5$O$_{12}$ | 0.5 | Li$_4$Ti$_5$O$_{12}$ | 10 | 95 | FG | 7 | 0.1 | 12 | 19.4 | 2.26 |
| 4-3 | Li$_4$Ti$_5$O$_{12}$ | 0.5 | Li$_4$Ti$_5$O$_{12}$ | 10 | 95 | FG | 7 | 0.5 | 12 | 19.4 | 2.25 |
| 4-4 | Li$_4$Ti$_5$O$_{12}$ | 0.5 | Li$_4$Ti$_5$O$_{12}$ | 10 | 95 | FG | 7 | 1 | 11 | 19.4 | 2.25 |
| 4-5 | Li$_4$Ti$_5$O$_{12}$ | 0.5 | Li$_4$Ti$_5$O$_{12}$ | 10 | 95 | FG | 7 | 1.5 | 10 | 19.2 | 2.24 |
| 1-6 | Li$_4$Ti$_5$O$_{12}$ | 0.5 | Li$_4$Ti$_5$O$_{12}$ | 10 | 95 | FG | 7 | 2 | 10 | 19.2 | 2.23 |
| 4-6 | Li$_4$Ti$_5$O$_{12}$ | 0.5 | Li$_4$Ti$_5$O$_{12}$ | 10 | 95 | FG | 7 | 2.5 | 9 | 19.2 | 2.23 |
| 4-7 | Li$_4$Ti$_5$O$_{12}$ | 0.5 | Li$_4$Ti$_5$O$_{12}$ | 10 | 95 | FG | 7 | 3 | 6 | 19.4 | 2.25 |

As presented in Table 4, in a case in which the weight proportion of the negative electrode conductive agent was 2.5% by weight or less (Experimental Examples 1-6 and 4-2 to 4-6), great peel strength was attained while the direct current resistance and load potential were each kept low as compared to a case in which the weight proportion was out of the above range (Experimental Examples 4-1 and 4-7).

Experimental Examples 5-1 to 5-9

As presented in Table 5, secondary batteries were fabricated as well as the battery characteristics thereof were evaluated according to the same procedure except that other elements were contained in lithium titanium composite oxide (Li$_4$Ti$_5$O$_{12}$) which was a negative electrode active material. The kinds and contents (mol %) of other elements are as presented in Table 5.

In this case, magnesium (Mg), zinc (Zn), aluminum (Al), gallium (Ga), and indium (In) were used as other elements.

In the case of containing other elements in lithium titanium composite oxide, a slurry was prepared by the wet mixing method described above and then the slurry was subjected to a heat treatment (treatment temperature=500° C., treatment time=5 hours). By this, other elements were fixed in the lithium titanium composite oxide. In this case, pure water was used as a solvent as well as magnesium acetate, zinc acetate, aluminum acetate, gallium acetate, and indium acetate were used as a source material.

As presented in Table 5, in a case in which other elements were contained in lithium titanium composite oxide (Experimental Examples 5-1 to 5-9), each of the direct current resistance and load potential decreased while great peel strength was maintained as compared to a case in which other elements were not contained in a plurality of lithium titanium composite oxides (Experimental Example 1-6).

Particularly in a case in which other elements were contained in lithium titanium composite oxide, each of the direct current resistance and load potential further decreased when the content of other elements was 0.001 mol % to 5 mol %.

Experimental Examples 6-1 to 6-7

As presented in Table 6, secondary batteries were fabricated as well as the battery characteristics thereof were evaluated according to the same procedure except that the composition of the electrolytic solution (solvent) was changed.

In this case, the content of the unsaturated cyclic carbonate ester in the electrolytic solution was changed as well as the unsaturated cyclic carbonate ester was not used. In addition, ethylene carbonate was used as a cyclic carbonate ester instead of propylene carbonate as well as diethyl carbonate was used as a chain carbonate ester instead of ethyl methyl carbonate.

TABLE 5

Positive electrode active material: LiFePO$_4$

| Experimental Example | Negative electrode active material (lithium titanium composite oxide) | | | Peel strength (mN/mm) | Direct current resistance (mΩ) | Load potential (V) |
|---|---|---|---|---|---|---|
| | Kind | Other elements | Content (mol %) | | | |
| 1-6 | Li$_4$Ti$_5$O$_{12}$ | — | — | 10 | 19.2 | 2.23 |
| 5-1 | Li$_4$Ti$_5$O$_{12}$ | Mg | 0.001 | 10 | 19.0 | 2.21 |
| 5-2 | Li$_4$Ti$_5$O$_{12}$ | Mg | 0.1 | 11 | 19.1 | 2.21 |
| 5-3 | Li$_4$Ti$_5$O$_{12}$ | Mg | 1 | 10 | 18.9 | 2.20 |
| 5-4 | Li$_4$Ti$_5$O$_{12}$ | Mg | 5 | 10 | 18.9 | 2.20 |
| 5-5 | Li$_4$Ti$_5$O$_{12}$ | Mg | 10 | 9 | 19.1 | 2.22 |
| 5-6 | Li$_4$Ti$_5$O$_{12}$ | Zn | 1 | 10 | 19.1 | 2.22 |
| 5-7 | Li$_4$Ti$_5$O$_{12}$ | At | 1 | 9 | 19.0 | 2.21 |
| 5-8 | Li$_4$Ti$_5$O$_{12}$ | Ga | 1 | 9 | 19.1 | 2.22 |
| 5-9 | Li$_4$Ti$_5$O$_{12}$ | In | 1 | 10 | 19.1 | 2.22 |

TABLE 6

Positive electrode active material: LiFePO$_4$

| | Electrolytic solution (solvent) | | | | | | |
|---|---|---|---|---|---|---|---|
| | | | Unsaturated cyclic carbonate ester | | | Direct | |
| Experiential Example | Cyclic carbonate ester | Chain carbonate ester | Kind | Content (% by weight) | Peel strength (mN/mm) | current resistance (mΩ) | Load potential (V) |
| 6-1 | PC | DMC + EMC | VC | 0.001 | 10 | 19.2 | 2.23 |
| 6-2 | PC | DMC + EMC | VC | 0.1 | 10 | 19.3 | 2.22 |
| 1-6 | PC | DMC + EMC | VC | 1 | 10 | 19.2 | 2.23 |
| 6-3 | PC | DMC + EMC | VC | 2.5 | 10 | 19.0 | 2.23 |
| 6-4 | PC | DMC + EMC | VC | 3 | 10 | 19.4 | 2.26 |
| 6-5 | PC | DMC + EMC | — | — | 10 | 19.6 | 2.28 |
| 6-6 | EC | DMC + EMC | VC | 1 | 10 | 19.5 | 2.26 |
| 6-7 | PC | DMC + DEC | VC | 1 | 10 | 19.6 | 2.25 |

As presented in Table 6, in a case in which an unsaturated cyclic carbonate ester was used (Experimental Examples 1-6 and 6-1 to 6-4), each of the direct current resistance and load potential further decreased as compared to a case in which an unsaturated cyclic carbonate ester was not used (Experimental Example 6-5).

Particularly in a case in which an unsaturated cyclic carbonate ester was used, each of the direct current resistance and load potential still further decreased when the content of the unsaturated cyclic carbonate ester in the electrolytic solution was 0.001% by weight to 2.5% by weight.

Incidentally, in a case in which propylene carbonate was used as a cyclic carbonate ester and dimethyl carbonate and ethyl methyl carbonate were used as a chain carbonate ester (Experimental Example 1-6), each of the direct current resistance and load potential decreased as compared to a case in which ethylene carbonate was used as a cyclic carbonate ester (Experimental Example 6-6) and a case in which diethyl carbonate was used as a chain carbonate ester (Experimental Example 6-7).

From the results presented in Tables 1 to 6, each of peeling durability characteristics, electric resistance characteristics, and load characteristics was ameliorated when the negative electrode active material contained a plurality of primary negative electrode active material particles and a plurality of secondary negative electrode active material particles (lithium titanium composite oxide) as well as the negative electrode conductive agent contained a plurality of flaky carbon materials and the above-described conditions for each of the configuration (particle size proportion and median diameter D50) of the negative electrode active material and the configuration (average aspect ratio and weight proportion) of the negative electrode conductive agent were satisfied. Consequently, excellent battery characteristics were attained in the secondary batteries.

The present technology has been described above with reference to a series of embodiments and Examples, but the present technology is not limited to the aspect described in the respective embodiments and Examples, and various modifications can be made.

Specifically, a case in which the battery element has a winding structure has been described, but the present technology is not limited to this. For example, the battery element may have another structure such as a stacked structure.

Moreover, a lithium ion secondary battery in which the capacity of the negative electrode is attained by utilizing the lithium storing phenomenon and the lithium release phenomenon has been mentioned as an example, but the present technology is not limited to this.

For example, the secondary battery may be a lithium metal secondary battery in which the capacity of the negative electrode is attained by utilizing a lithium precipitation phenomenon and a lithium dissolution phenomenon. Moreover, the secondary battery may be, for example, a secondary battery in which the capacity of the negative electrode is attained based on the sum of the capacity due to storage and release of lithium and the capacity due to precipitation and dissolution of lithium by setting the capacity of a negative electrode active material capable of storing and releasing lithium to be smaller than the capacity of the positive electrode.

Moreover, a lithium ion secondary battery in which lithium was used as an electrode reactant has been described, but the present technology is not limited to this. The electrode reactant may be, for example, other group 1 elements in the extended periodic table such as sodium and potassium, group 2 elements in the extended periodic table such as magnesium and calcium, or other light metals such as aluminum. In addition, the electrode reactant may be an alloy containing any one kind or two or more kinds among the series of elements described above.

Incidentally, the effects described in the present specification are an illustration to the utmost and are not limited. Moreover, there may be other effects.

The present technology is described below in further detail according to an embodiment.
(1) A secondary battery including:
a positive electrode;
a negative electrode (A) including a negative electrode active material layer containing a negative electrode active material and a negative electrode conductive agent, in which (B) the negative electrode active material contains a plurality of primary negative electrode active material particles and a plurality of secondary negative electrode active material particles, (C) the negative electrode active material contains a lithium titanium composite oxide, in which the lithium titanium composite oxide includes at least one kind among compounds represented by respective Formulas (1) to (3), (D) a proportion of the number of the plurality of primary negative electrode active material particles to a sum of the number of the plurality of primary negative electrode active material particles and the number of the secondary negative electrode active material particles is 95% or more, (E) a median diameter D50 of the plurality of primary negative electrode active material particles is 0.1 µm or more and 1 µm or less, (F) the negative electrode conductive agent contains a plurality of flaky carbon materials, (G) an average aspect ratio of the plurality of flaky carbon materials is 6 or more and 8.5 or less, and (H) a proportion of a weight of the negative electrode conductive agent with respect to a weight of the negative electrode active material layer is 2.5% by weight or less; and an electrolytic solution, $$Li[Li_xM1_{(1-3x)/2}Ti_{(3+x)/2}]O_4 \quad (1)$$

(M1 represents at least one kind among magnesium (Mg), calcium (Ca), copper (Cu), zinc (Zn), and strontium (Sr). x satisfies 0≤x≤1/3.)

$$Li[Li_yM2_{1-3y}Ti_{1+2y}]O_4 \quad (2)$$

(M2 represents at least one kind among aluminum (Al), scandium (Sc), chromium (Cr), manganese (Mn), iron (Fe), germanium (Ge), gallium (Ga), and yttrium (Y). y satisfies 0≤y≤1/3.)

$$Li[Li_{1/3}M3_zTi_{(5/3)-z}]O_4 \quad (3)$$

(M3 represents at least one kind among vanadium (V), zirconium (Zr), and niobium (Nb). z satisfies 0<z<2/3.)
(2) The secondary battery according to (1), in which
the lithium titanium composite oxide further contains another element fixed on a surface of the compounds represented by the respective Formulas (1) to (3),
the other element includes at least one kind among magnesium, zinc, aluminum, gallium, and indium,
a content of the other element in the lithium titanium composite oxide is 0.001 mol % or more and 5 mol % or less.
(3) The secondary battery according to (1) or (2), in which
the flaky carbon materials contain flaky graphite.
(4) The secondary battery according to any one of (1) to (3), in which
the positive electrode contains a positive electrode active material, in which
the positive electrode active material contains a lithium-containing phosphate compound represented by Formula (11):

$$Li_aM11PO_4 \quad (11)$$

(M11 represents at least one kind among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies 0.9≤a≤1.1).
(5) The secondary battery according to any one of (1) to (4), in which
the electrolytic solution contains a cyclic carbonate ester and a chain carbonate ester, in which
the cyclic carbonate ester contains propylene carbonate, and
the chain carbonate ester contains dimethyl carbonate and ethyl methyl carbonate.
(6) The secondary battery according to any one of (1) to (5), in which
the electrolytic solution contains an unsaturated cyclic carbonate ester, in which
the unsaturated cyclic carbonate ester contains at least one kind among vinylene carbonate, vinyl ethylene carbonate, and methylene ethylene carbonate.

(7) The secondary battery according to (6), in which
a content of the unsaturated cyclic carbonate ester in the electrolytic solution is 0.001% by weight or more and 2.5% by weight or less.
(8) The secondary battery according to any one of (1) to (7), which is a lithium ion secondary battery.
(9) A battery pack including:
the secondary battery according to any one of (1) to (8);
a controller that controls operation of the secondary battery; and
a switch unit that switches the operation of the secondary battery in accordance with instruction from the controller.
(10) An electrically driven vehicle including:
the secondary battery according to any one of (1) to (8);
a converter that converts electric power supplied from the secondary battery into driving force;
a driving unit to be driven in accordance with the driving force; and
a controller that controls operation of the secondary battery.
(11) An electric power storage system including:
the secondary battery according to any one of (1) to (8);
one or two or more electrical machinery and apparatuses to which electric power is supplied from the secondary battery; and
a controller that controls electric power supply from the secondary battery to the electrical machinery and apparatuses.
(12) An electric tool including:
the secondary battery according to any one of (1) to (8); and
a moving unit to which electric power is supplied from the secondary battery.
(13) An electronic device including:
the secondary battery according to any one of (1) to (8) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a positive electrode;
a negative electrode including a negative electrode active material layer including a negative electrode active material and a negative electrode conductive agent, and
an electrolytic solution,
wherein the negative electrode active material includes a plurality of primary negative electrode active material particles and a plurality of secondary negative electrode active material particles, and the negative electrode active material includes a lithium titanium composite oxide,
wherein the lithium titanium composite oxide includes a compound represented by the following Formula (1):

$$Li[Li_xM1_{(1-3x)/2}Ti_{(3+x)/2}]O_4 \quad (1)$$

wherein a ratio of a number of the primary negative electrode active material particles to a sum of the number of the primary negative electrode active material particles and a number of the secondary negative electrode active material particles is 95% or more, wherein a median diameter D50 of the primary negative electrode active material particles is from 0.1 μm to 1 μm, wherein the negative electrode conductive agent includes a plurality of flaky carbon materials provided on a surface of a current collector of the negative electrode, wherein an average aspect ratio of the flaky carbon materials is from 6 to 8.5, and wherein a ratio of a weight of the negative electrode conductive agent to a weight of the negative electrode active material layer is 2.5% by weight or less.

2. The secondary battery according to claim 1, wherein the lithium titanium composite oxide further includes an element fixed on a surface of the compound represented by the Formula (1), the element includes at least one element among magnesium, zinc, aluminum, gallium, and indium, and a content of the element in the lithium titanium composite oxide is from 0.001 mol % to 5 mol %.

3. The secondary battery according to claim 1, wherein the flaky carbon materials include flaky graphite.

4. The secondary battery according to claim 1, wherein the positive electrode includes a positive electrode active material, and wherein the positive electrode active material includes a lithium-containing phosphate compound represented by Formula (11):

$$Li_aM11PO_4 \tag{11}$$

wherein M11 represents at least one element among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), and a satisfies $0.9 \leq a \leq 1.1$.

5. The secondary battery according to claim 1, wherein the electrolytic solution includes a cyclic carbonate ester and a chain carbonate ester, wherein the cyclic carbonate ester includes propylene carbonate, and the chain carbonate ester includes dimethyl carbonate and ethyl methyl carbonate.

6. The secondary battery according to claim 1, wherein the electrolytic solution includes an unsaturated cyclic carbonate ester, wherein the unsaturated cyclic carbonate ester includes at least one element among vinylene carbonate, vinyl ethylene carbonate, and methylene ethylene carbonate.

7. The secondary battery according to claim 6, wherein a content of the unsaturated cyclic carbonate ester in the electrolytic solution is 0.001% by weight or more and 2.5% by weight or less.

8. The secondary battery according to claim 1, wherein the secondary battery includes a lithium ion secondary battery.

9. A battery pack comprising:

a secondary battery;

a controller configured to control operation of the secondary battery; and a switch configured to switch operation of the secondary battery in accordance with instruction from the controller, wherein the secondary battery includes a positive electrode;

a negative electrode including a negative electrode active material layer including a negative electrode active material and a negative electrode conductive agent, and an electrolytic solution, wherein the negative electrode active material induces a plurality of primary negative electrode active material particles and a plurality of secondary negative electrode active material particles, and the negative electrode active material includes a lithium titanium composite oxide, wherein the lithium titanium composite oxide includes a compound represented by the following Formula (1):

$$Li[Li_xM1_{(1-3x)/2}Ti_{(3+x)/2}]O_4 \tag{1}$$

wherein a ratio of a number of the primary negative electrode active material particles to a sum of the number of the primary negative electrode active material particles and a number of the secondary negative electrode active material particles is 95% or more, wherein a median diameter D50 of the primary negative electrode active material particles is from 0.1 μm to 1 μm, wherein the negative electrode conductive agent includes a plurality of flaky carbon materials provided on a surface of a current collector of the negative electrode, wherein an average aspect ratio of the flaky carbon materials is from 6 to 8.5, and wherein a ratio of a weight of the negative electrode conductive agent to a weight of the negative electrode active material layer is 2.5% by weight or less.

10. An electronic device comprising:

the secondary battery according to claim 1 as an electric power supply source.

* * * * *